US012210931B2

(12) United States Patent
Anand

(10) Patent No.: US 12,210,931 B2
(45) Date of Patent: Jan. 28, 2025

(54) COMBINED DATA RETRIEVAL AND TAMPER-EVIDENT SECURITY SYSTEM

(71) Applicant: Ashish Anand, Bangalore (IN)

(72) Inventor: Ashish Anand, Bangalore (IN)

(73) Assignee: Ashish Anand (IN)

( * ) Notice: Subject to any disclaimer, the term of this patent is extended or adjusted under 35 U.S.C. 154(b) by 0 days.

(21) Appl. No.: 18/041,806

(22) PCT Filed: Aug. 18, 2021

(86) PCT No.: PCT/IB2021/057579
§ 371 (c)(1),
(2) Date: Feb. 16, 2023

(87) PCT Pub. No.: WO2022/038524
PCT Pub. Date: Feb. 24, 2022

(65) Prior Publication Data
US 2023/0306217 A1   Sep. 28, 2023

(30) Foreign Application Priority Data

Aug. 18, 2020 (IN) .............................. 202041035551
Sep. 24, 2020 (IN) .............................. 202041041350
Jul. 8, 2021 (IN) .............................. 202141030690

(51) Int. Cl.
G06K 7/14   (2006.01)
G06F 3/00   (2006.01)

(52) U.S. Cl.
CPC .................................. *G06K 7/1417* (2013.01)

(58) Field of Classification Search
CPC .. G06Q 20/341; G06Q 20/354; G06Q 20/355; G06Q 20/34; G06Q 20/3278;
(Continued)

(56) References Cited

U.S. PATENT DOCUMENTS

2015/0332109 A1* 11/2015 Anand ..................... G06K 7/10
                                                        382/195
2016/0314475 A1* 10/2016 Nudel ................. G06F 16/9554
(Continued)

FOREIGN PATENT DOCUMENTS

CN          207148880 U      3/2018
EP          3567513 A1 *    11/2019 ........... G06K 7/0095
WO    WO-2006062998 A2 *     6/2006 ............. G06F 21/31

OTHER PUBLICATIONS

Singh, "Barcode technology and its application in libraries and Information centers" (Year: 2015).*
(Continued)

*Primary Examiner* — Thien T Mai

(57) ABSTRACT

The system comprises of a security label engaged to a package. The label comprises of a first layer with a first code and a second layer with a second code. The first layer is disposed over the second layer in a way that at least a portion of the second code on the second layer is covered by the first layer. The second code on the second layer is revealed upon irreversibly disengaging the first layer from the package. The first code is associated with a first information and the second code is associated with a second information. The second code on the second layer is associated with the first code on the first layer. These codes are authentication-wise interlinked and as one single label which can be pre-applied on product-label and still extended authentication challenge like refill-evidence or tamper-evidence in addition to basic counterfeit-evidence.

19 Claims, 19 Drawing Sheets

(58) Field of Classification Search
CPC ............ G06Q 20/4018; G06Q 20/352; G06Q 20/105; G06Q 20/348; G06Q 20/349; G06Q 20/347; G06K 7/1417; G06K 19/07703; G06K 19/07; G06K 19/06046; G06K 19/07749; G06K 19/06037; G06K 19/0723; G06K 19/07732; G06K 7/10297; G09F 3/00; G09F 2003/0201; G09F 2003/0285; G09F 2003/0272; G09F 2003/0257; G09F 3/0292; G09F 3/0295; G09F 3/03

See application file for complete search history.

(56) References Cited

U.S. PATENT DOCUMENTS

2018/0181939 A1* 6/2018 Hamilton ............. G06Q 20/322
2020/0082428 A1* 3/2020 Desai ................ G06Q 30/0226
2022/0415112 A1* 12/2022 Weisbecker .......... G07F 7/0813

OTHER PUBLICATIONS

Robinson, "Sequential fraud detection for prepaid cards using hidden Markov model divergence" (Year: 2017).*

* cited by examiner

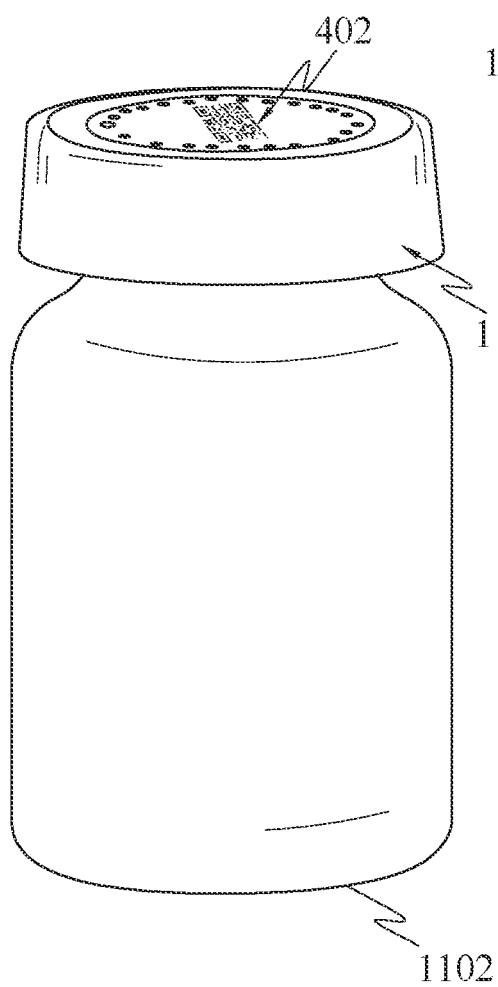
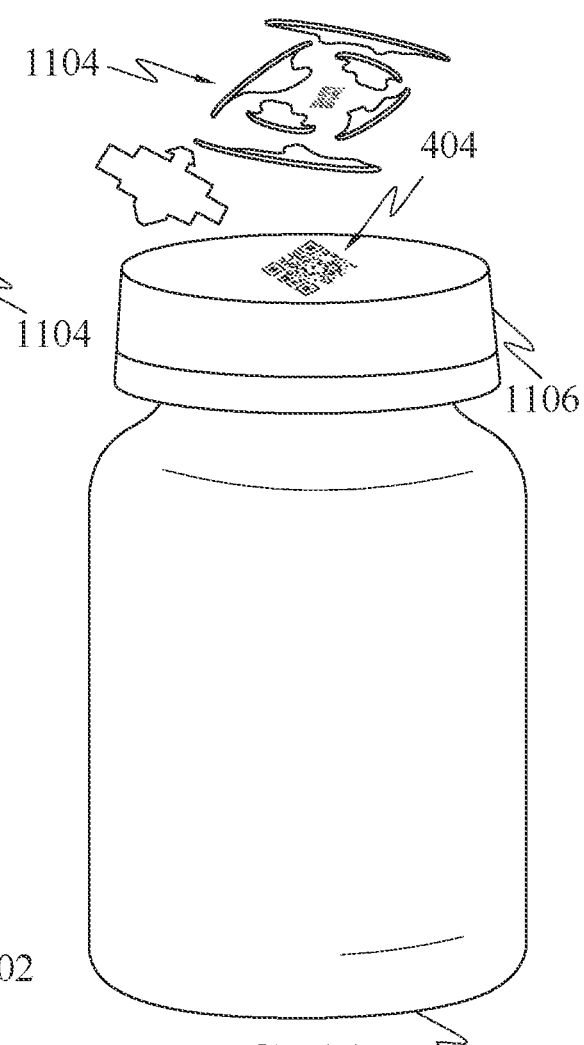
FIG. 11A　　　　　　FIG. 11B
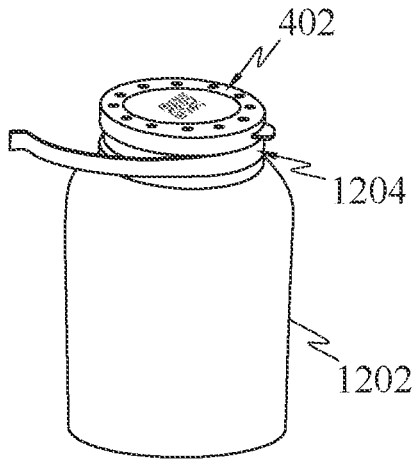
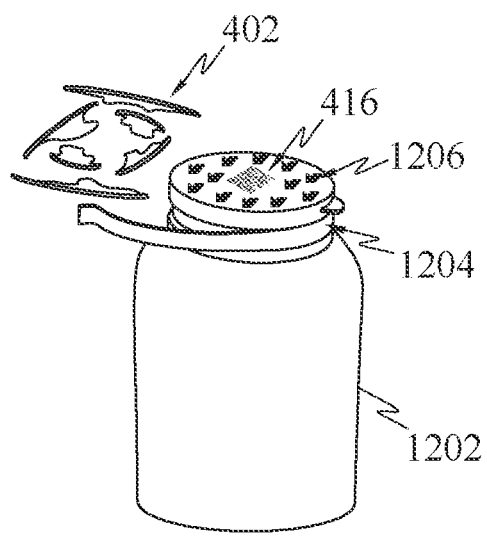
FIG. 12A　　　　　　FIG. 12B

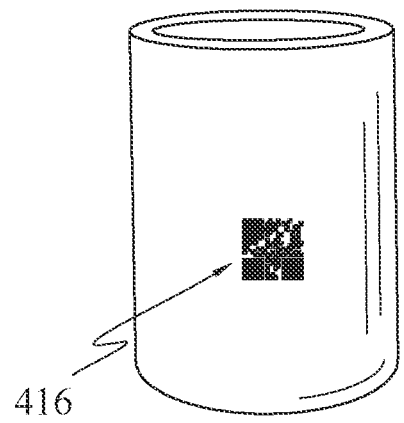 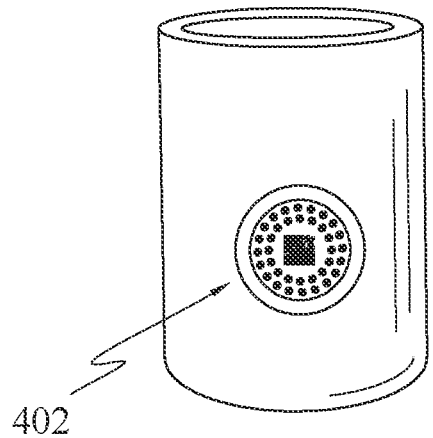
FIG. 13A  FIG. 13B
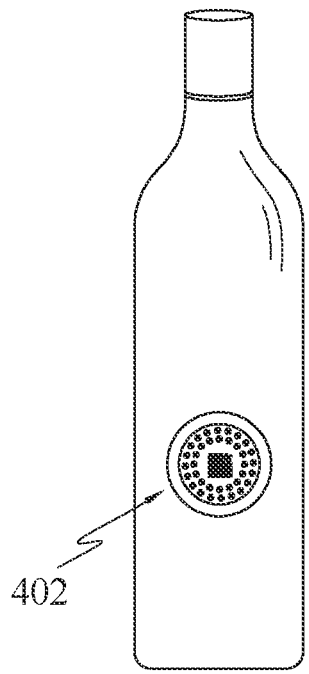 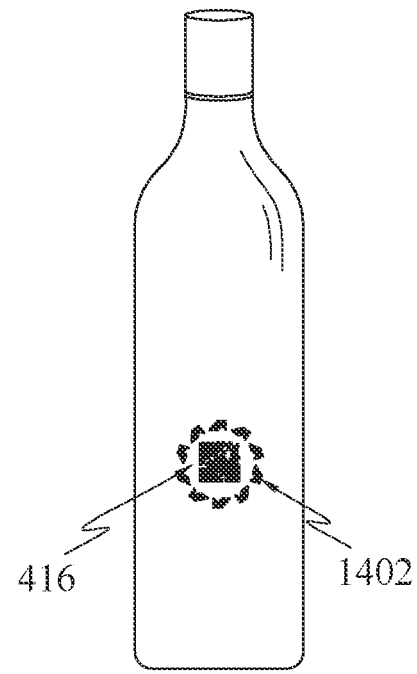
FIG. 14A  FIG. 14B

COMBINED DATA RETRIEVAL AND TAMPER-EVIDENT SECURITY SYSTEM

BACKGROUND OF THE INVENTION

Unless otherwise indicated herein, the materials described in this section are not prior art to the claims in this application and are not admitted to being prior art by inclusion in this section.

FIELD OF THE INVENTION

The invention relates to field of security labels. More particularly, but not exclusively, the invention relates to a combined data retrieval and tamper-evident security system.

DESCRIPTION OF RELATED ART

Security labels have been employed in the packaging industry from a long time. Security labels are usually secured onto the packaging container in a way that if the packaging container is tampered to access product(s)/item(s) within the container, it would be evident that the packaging container has been tampered upon examining the security label.

However, most of the security labels available in the market are self-adhesive and usually suffer from lack of adhesion on certain surfaces especially when they are subjected to heat or solvent. Tamper evidence require strong adhesion which may not be possible on certain substrates like corrugated cartons given using heat-gun most of adhesives will be loosened. Employment of heat would allow easy peeling of the security label thereby providing easy access to the product(s)/item(s) within the container. The security label can then be reapplied without any tamper evidence or change in spatial orientation.

Furthermore, the security labels available in the market are configured to perform a single task. There is need of single label addressing many forms of authentications ranging from counterfeit-evidence, tamper-evidence, and refill-evidence. Further tamper-evidence and refill-evidence requires label-application after packaging is sealed. There is further need of security labels those can be pre-applied on product-label and still solves problem of refill-evidence without involving complex problem of security-label application on cap and neck.

In addition, most of the packaging usually employ single layer security label. Employment of a single layer security label may sometimes allow easy breaching of the package.

In view of this, there is a need for an improved security label system that is effective and efficient and can overcome the drawbacks encountered by the security labels already available in the market.

SUMMARY OF THE INVENTION

In one aspect of the embodiment, a tamper-evident security system is provided. The system comprises a security label configured to be engaged onto a package. The security label comprises of a first layer and a second layer. The first layer is provided with a first code. The second layer is provided with a second code. The first layer is configured to be disposed over the second layer in a way that at least a portion of the second code on the second layer is covered by the first layer. The second code is configured to remain hidden behind or towards bottom of the first layer and is revealed only upon irreversible disengagement of the first layer from the package. The first code on the first layer is associated with a first information. The second code on the second layer is associated with the second information. The second code is configured to be associated with the first code.

BRIEF DESCRIPTION OF DRAWINGS

Embodiments are illustrated by way of example and not limitation in the figures of the accompanying drawings, in which like references indicate similar elements and in which:

FIGS. 11A-11B illustrates a two-layer security label 400 engaged on a bottle 1102 with a shrink wrap 1104, in accordance with an embodiment;

FIGS. 12A-12B illustrates a two-layer security label 400 engaged on a bottle 1202 with breakable seal cap 1204, in accordance with an embodiment;

FIGS. 13A-13B illustrates a two-layer security label 400 on product-label roll configured to be engaged on a container 1302, in accordance with an embodiment;

FIGS. 14A-14B illustrates a two-layer security label 400 configured to be engaged on a bottle 1402, in accordance with an embodiment;

DETAILED DESCRIPTION

The following detailed description includes references to the accompanying drawings, which form a part of the detailed description. The drawings show illustrations in accordance with example embodiments. These example embodiments, which may be herein also referred to as "examples" are described in enough detail to enable those skilled in the art to practice the present subject matter. However, it may be apparent to one with ordinary skill in the art, that the present invention may be practised without these specific details. In other instances, well-known methods, procedures and components have not been described in detail so as not to unnecessarily obscure aspects of the embodiments. The embodiments can be combined, other embodiments can be utilized, or structural, logical, and design changes can be made without departing from the scope of the claims. The following detailed description is, therefore, not to be taken in a limiting sense, and the scope is defined by the appended claims and their equivalents.

In this document, the terms "a" or "an" are used, as is common in patent documents, to include one or more than one. In this document, the term "or" is used to refer to a nonexclusive "or," such that "A or B" includes "A but not B," "B but not A," and "A and B," unless otherwise indicated.

In this document codes are not limited to be human readable or machine scannable. Further if codes are machine scannable these are not limited to specific encoding like barcode, QR code, 2D matrix or GS1 codes. This document explains embodiments taking QR code as example for codes such as not to make it obscure, but it should not be construed as limitation.

Figure 1:
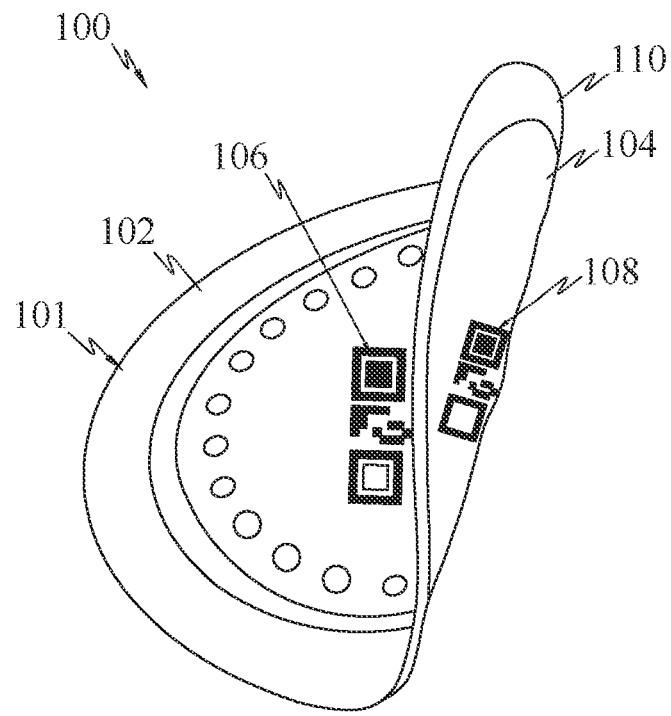
FIG. 1 illustrates a security label 100 of a combined data retrieval and tamper-evident security system 200, in accordance with an embodiment.

FIG. 1 illustrates a security label 100 of a combined data retrieval and tamper-evident security system 200, in accordance with an embodiment. The security label 100 may be configured to be engaged to, but not limited to, any type of package. The security label 100 may comprise of first layer 101. The first layer 101 may comprise of a top side 102 and a bottom side 104. The bottom side 104 may be provided on a side opposite to that of the top side 102. The top side 102 of the security label 100 may be provided with a first code 106. The bottom side 104 of the security label 100 may be provided with a second code 108. The security label 100 may be engaged to the package via the bottom side 104. The bottom side 104 of the security label 100 may be provided with adhesive along its periphery 110 that may enable engagement of the security label 100 to the package. The adhesive on the bottom side 104 may be provided around the second code 108 in a way that the adhesive may not interfere with the second code 108. The security label 100 when engaged to the package, the bottom side 104 of the security label 100 may remain hidden under the top side 102. The bottom side 104 with the second code 108 may be revealed on disengagement of the top side 102 from the package. Disengagement of the first layer 101 and first code 106 on the first layer 101 may be destructive such that if it is reengaged or even cloned version is re-engaged the scan of the first code 106 identifies prior disengagement on scan. The second code 108 on bottom side 104 of the first layer 101 can be interlinked with first code 106.

It is to be noted that the second code 108 needs to be hidden by an intelligent layer. The term disengagement mentioned in any of the embodiments implies irreversible disengagement that is necessary to reveal the second code 108. First layer 101 disengagement does not mean opening of package rather it means irreversible peel of scannable the first layer 108 having the first code 106. The first layer 101 with the first code 106 may break in bits & pieces on peeling. In cases where the first layer 101 is not of a destructible material and the first layer 101 gets peeled intact, then on reengagement of such security labels tampering is indicated on-scan even without any visual sign of tamper-evidence noticeable by human eye. Furthermore, the code may be made copy-proof so that it cannot be cloned/duplicated. So once disengaged irreversibly, either reengagement of the security label is not possible physically or may be detected as either tampered or duplicate. However, irreversibility may not be that tight in some embodiments although covered within scope of invention wherein the first layer 101 can be destructible that breaks in bits & pieces or leaves tamper-evident marks noticeable to human eye on peel before the second code 108 gets exposed but the first code 106 is not copy-proof (ordinary machine-scannable codes like QR code or human readable alphanumeric number) and hence can be cloned again on reengaged layer on same package or upon different package and irreversibility is compromised to some extent by threat of cloning. Minimum level of irreversibility implies that the first layer 101 either gets destructed or leaves tamper-evident marks noticeable to human eye before exposing second code 108. Also, batch of unique first code 106 and batch of unique second code 108 is printed together. Batch information is provisioned on backend server so that authentication of both codes is interlinked together. If printing happens in one monolithic operation, then interlinking will be exact 1:1 within batch otherwise if printing on two codes happens in two separate processes, then there may be offset in interlinking (during initial setup). For example, offset of 2 means—sequence no. 3 of second code printed along-with sequence no. 1 of first code and so on. However later. if one label is scanned by the operator then backend can be configured to record the offset in interlinking out of separate printing process.

In an embodiment, the security label 100 may be tamper-evident, implying when the security label 100 is disengaged, the bottom side 104 of the security label 100 may leave tamper evident marks on the package thereby determining tampering of the security label 100.

In an embodiment, the first code 106 may be any machine scannable code. The first code 106 may be, but not limited to, a QR code, a BAR code or any GS1 machine scannable code. The first code 106 may be configured to be associated with a first information. The first information may be, but not limited to, details relating to a product/package on which the security label 100 may be engaged. The details of the product may include, but not limited to, product code of a product assigned by the manufacturers, name of the brand that manufactures the product, manufacturing date of the product, manufacturing location of the product, location from where the package is scheduled to dispatched, quantity of the products etc.

In an embodiment, second code 108 may be exposed only after irreversible disengagement of the first code 106 on the first layer 101. The first code 106 and the second code 108 may be simple human readable or machine scannable as well. If either or both of the codes are machine-scannable these can be copy-proof. While ordinary machine scannable codes like QR code/BAR code can be scanned by standard smartphones without requiring any specific application, copy-proof codes can only be scanned by specific applications on scanning device.

In one embodiment, the first information may be configured to be encrypted or embedded and/or interlinked with the first code 106 in a way that the first information may be accessed when the first code 106 is scanned by any scanning device configured to scan machine scannable code.

In an embodiment, the first code 106 on the security label 100 may be configured to be scanned multiple times.

In an embodiment, the second code 108 on the bottom side 104 may be any machine scannable code. The second code 108 may be, but not limited to, a QR code, a BAR code or any GS1 machine scannable code or a human readable code that may need to be manually entered into a scanning device 202. The second code 108 may be configured to be associated with the first code 106. The second information may relate to a unique information of the package or any independent information.

In one embodiment, the second information may be configured to be encrypted/embedded into/associated with the second code 108 in a way that the second information may be accessed when the second code 108 is scanned by any scanning device that may be configured to scan machine scannable code.

Figure 2:
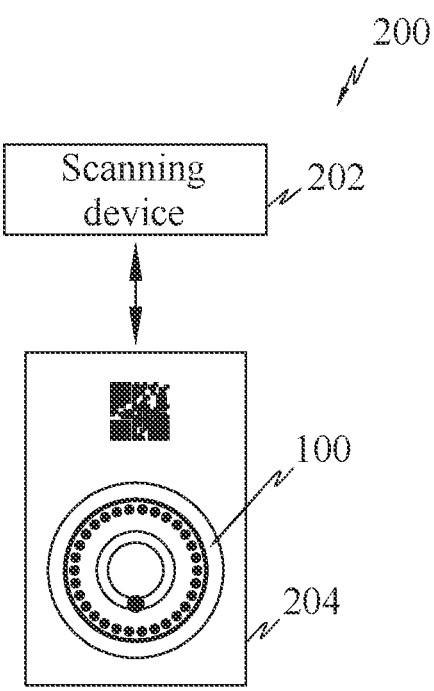
FIG. 2 illustrates the system 200 comprising of a scanning device 202 and the security label 100, in accordance with an embodiment.

FIG. 2 illustrates a system 200 comprising of a scanning device 202 and the security label 100 engaged to a package 204, in accordance with an embodiment. The system 200 may comprise of a scanning device 202 that may be configured to scan any machine scannable code. The scanning device 202 may be configured to scan the first code 106 to evoke basic authentication of the package. The scanning device 202 may be configured to scan the second code 108 to retrieve the second information that relates to a unique information of the package.

Figure 3:
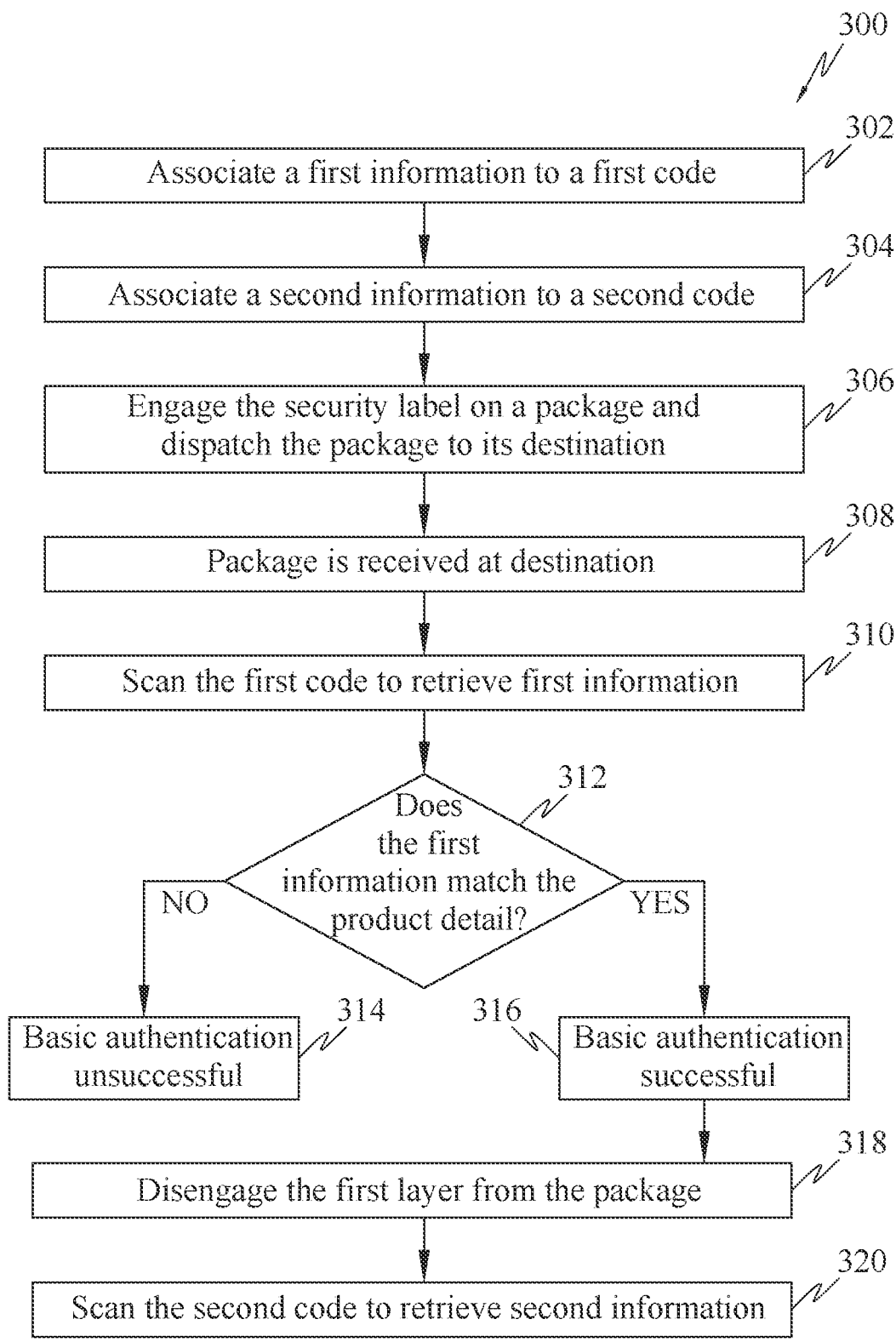
FIG. 3 illustrates a flowchart 300 of a method of retrieving information from codes on the security label 100, in accordance with an embodiment.

FIG. 3 illustrates a flowchart 300 of a method of retrieving information from encrypted codes on the security label 100. Referring to step 302, a first information is associated with the first code 106 on the top side 102 of the security label 100. Here the first information discussed in the foregoing required for basic authentication is configured to be encrypted/embedded/interlinked in the form of first code 106 that is machine scannable.

Referring to step 304, a second information is associated with the second code 108 on the bottom side 104 of the security label 100. Here the second information discussed in the foregoing required for additional authentication is configured to be encrypted in the form of second code 108 that is machine scannable.

Referring to step 306, the security label 100 with the first code 106 and second code 108 is engaged to a package 204 and despatched to its destination.

Referring to step 308, the package 204 is received at its destination.

Referring to step 310, the first code 106 on the security label 100 is scanned using the scanning device 202 to retrieve first information to execute basic authentication. Here the first code 106 on the top side 102 of the security label 100 is scanned to retrieve the first information encrypted in the first code 106. The first information allows a user to verify package details and determine the basic authentication of the package 204.

Referring to step 312, the first information retrieved from the first code 106 is compared with the package 204. Here the retrieved first information of the package 204 stored in the first code 106 are optionally compared with the package 204 itself by the user. In case the details do not match, the user determines unsuccessful authentication (at step 314). In case the details match, the user determines successful authentication (at step 316).

Referring to step 318, the top side 102 is disengaged to reveal the second code 108 on the bottom side 104.

Referring to step 320, the second code 108 on the security label 100 is scanned using the scanning device 202 to retrieve second information. Here the second code 108 is scanned by the scanning device 202 to retrieve second information encrypted in the second code 108. This second information relates to additional information, wherein the additional information gets associated with the user scanning the package 204. Furthermore, for interlinked authentication of both codes, it may be enforced that both codes should be scanned by the same scanning device to ensure same user is scanning both codes. It can also be enforced that both codes be scanned within configured time period and/or from same location or form different locations in adjacent geography. In general—Second code scan may not be allowed or activated without prior scanning of the first code and/or successful scanning of the first code.

In an embodiment, the second code 108 may be associated to the first code 106 in a way that the second code 108 may be activated for further scans only upon successful scan of the first code 108. Successful scan of first code 106 (that is preferred to be copy-proof) means either the code is detected as valid in database, not blacklisted, original and non-tampered. If code is detected as tampered or duplicated, then authentication is not successful even though it can be valid and not blacklisted. However, if the first code 106 is ordinary code like QR code then successful authentication simply means it is valid and not blacklisted. In general—a second code may be activated upon successful authentication of first code.

In one embodiment, the first information associated with the first code 106 and the second information associated with the second code 108 may be discarded upon successful scanning of the second code 108 and these codes may be blocked in database 606.

Figure 4A:
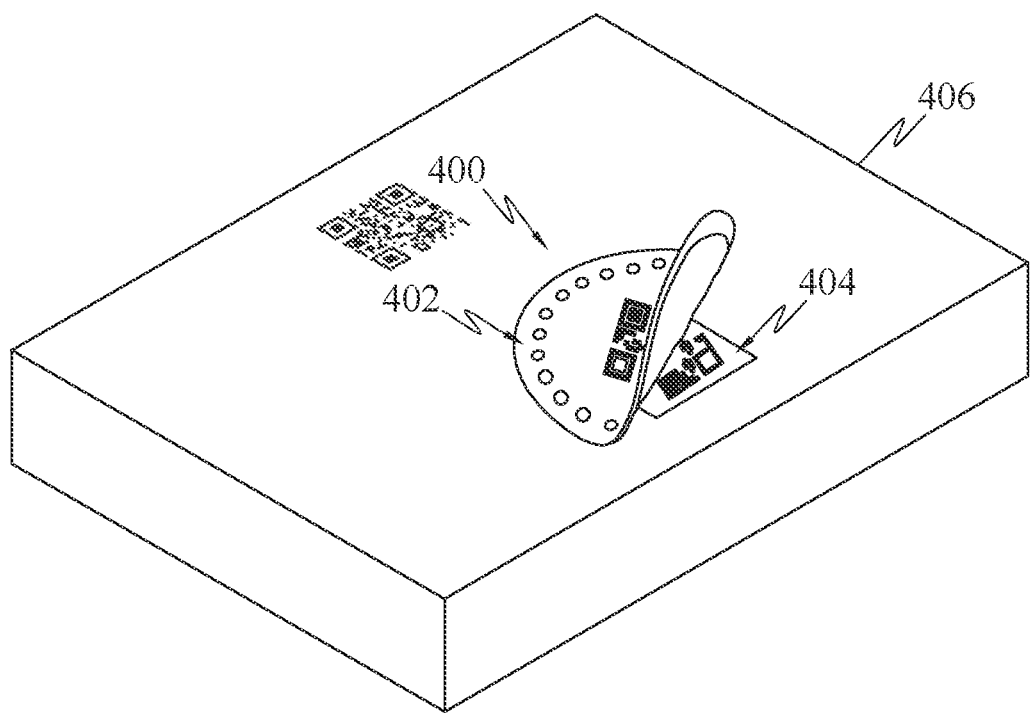
FIGS. 4A-4C illustrate a security label 400 comprising two separate layers, in accordance with an embodiment.
Figure 4B:
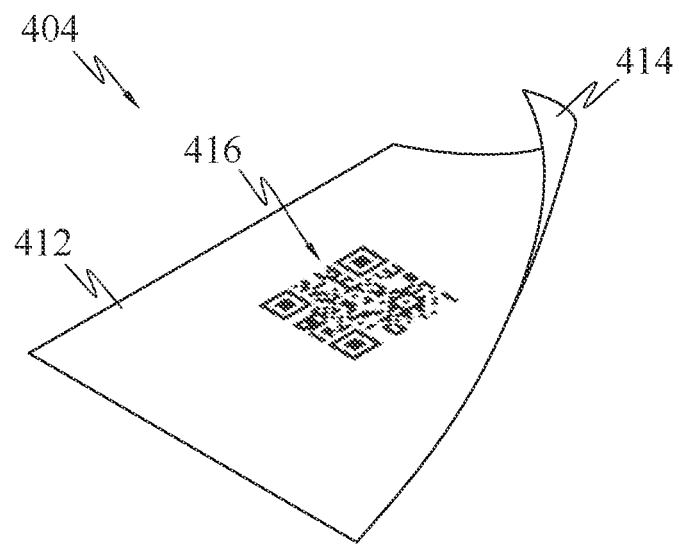
Figure 4C:
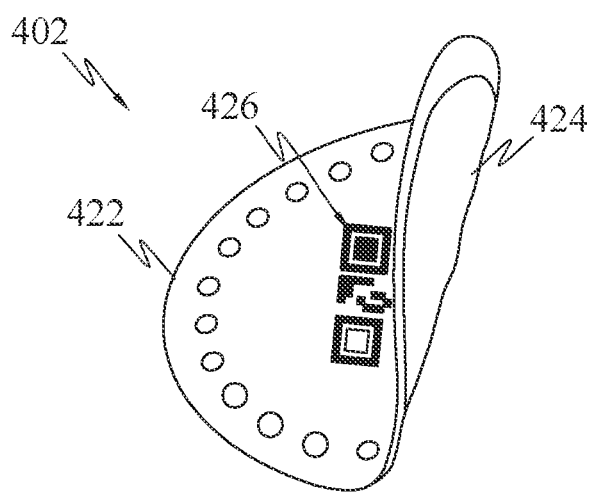

FIGS. 4A-4C illustrates a security label 400 comprising of two layers, in accordance with an embodiment. The security label 400 may comprise of a first layer 402 (refer FIG. 4A) and a second layer 404 (refer FIG. 4B). The first layer 402 and the second layer 404 may be two separate layers that may be provided with adhesive for engagement on a package 406. The adhesive on the first layer 402 and the second layer 404 may enable engagement of the security label 400 on the package 406 in a way that the first layer 402 is disposed over the second layer 404. The second layer 404 may comprise of two sides (refer FIG. 4B). The second layer 404 may comprise of a third side 412 and a fourth side 414. The fourth side 414 of the second layer 404 may be provided with adhesive that may enable engagement of the second layer 404 on the package 406. The second layer 404 may be engaged to the package 406 before engaging the first layer 402 over the second layer 404. The third side 412 of the second layer 404 may be provided with a second code 416. The second code 416 on the third side 412 of the second layer 404 may be associated with a second information, wherein scanning of the second code 416 may provide access to the second information.

The first layer 402 may comprise of a first side 422 and a second side 424 (refer FIG. 4C). The first layer 402 may be provided with adhesive towards, but not limited to, its edges on its second side 424 of the first layer 402. The first layer 402 may be engaged on the package 406 via the second side 424 provided with the adhesive. The first layer 402 may be engaged over the second layer 404 in a way that at least a portion of the second layer 404 is covered by the first layer 402. The first layer 402 may comprise of a first code 426. The first code 426 may be associated to a first information, wherein scanning of the first code 426 may provide access to the first information.

In an alternate embodiment, both layers of the security label may be one monolithic unit that may be configured to be applied by a label-applicator.

Figure 5A:
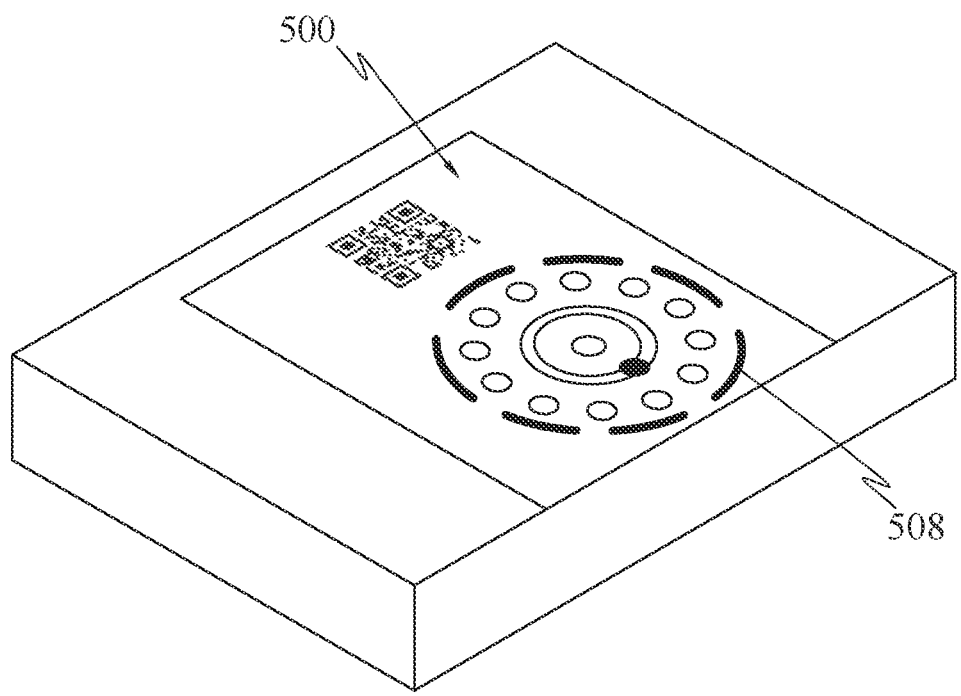
FIGS. 5A-5B illustrate a security label 500 comprising two separate layers with perforations 508 on one layer, in accordance with an embodiment.
Figure 5B:
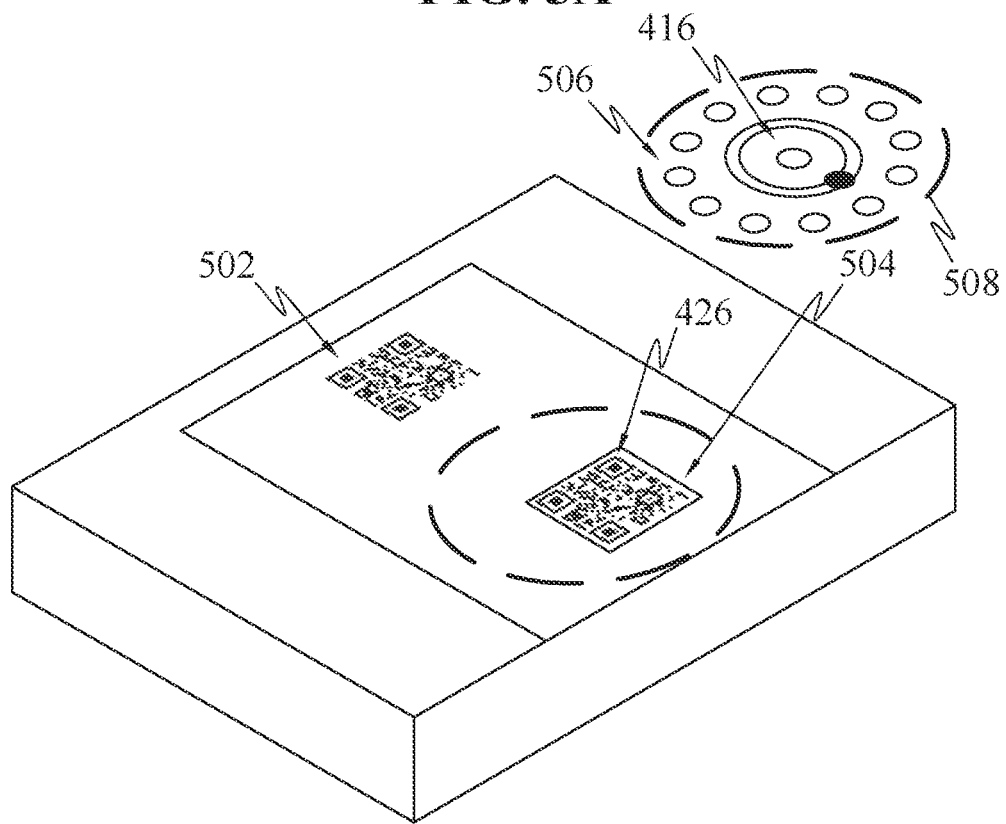

Referring to FIGS. 5A-5B, an alternate embodiment of a security label 500 comprising of two layers is disclosed. The security label 500 may comprise of a first layer 502 and a second layer 504. The first layer 502 of the security label 500 may comprise of a first portion 506 that may be configured to be disengaged from the first layer 502. The first portion 506 on the first layer 502 may be provided with perforations 508 along its periphery. The first portion 506 may be disengaged from the first layer 502 along its perforations 508. The disengagement of the first portion 506 from the first layer 502 may reveal the second code 416 on the second layer 504. Both the first code 426 and the second code 416 may be configured to be machine scannable, wherein scanning of the first code 426 and the second code 416 may enable retrieval of the first information and the second information, respectively.

The disengagement of the first portion 506 from the first layer 502 may determine tampering of the security label 500. Furthermore, reengaging of the disengaged first portion 506 back on the first layer 502 may determine tampering as the perforations 508 along the edges of the periphery of the first portion 506 may exhibit uneven cuts along the perforations 508. Re-engaging may be possible when the first layer of the security label is not destructible on-disengagement (for example with In-Mold labels, first layer may not be destructible).

In an embodiment, the first portion 506 of the first layer 502 may be, but not limited to, destructible/tear able upon disengaging the first portion 506 from the first layer 502.

Referring to FIG. 1 and FIG. 2, the system 200 may comprise of scanning device 202 that may be configured to scan any machine scannable codes. The scanning device 202 may be configured to scan the first code 106 and the second code 108 on the first layer 102 and bottom side 104 of the security label 100, respectively. The scanning of the first code 106 and the second code 108 may allow retrieval of the first information and the second information stored in the respective first code 106 and the second code 108. The scanning of the first code 106 may provide access to first information that may be associated with but not limited to, name of the brand that manufactures a product which is packaged, product code of the product assigned by the manufacturers, manufacturing date of the product, manufacturing location of the product, location from wherein the package was dispatched, quantity of the products etc. stored in the first code 106. This may enable a user to verify the authenticity of the package 204.

In an embodiment, the scanning device 202 may be any scanning device that may be configured to scan machine scannable codes. The scanning device 202 may be, but not limited to, a BAR code scanner, a QR code scanner or any one of GS1 machine code scannable scanner.

In an alternate embodiment, the scanning device 202 may be any mobile device that may be configured to scan any machine scannable codes.

In an embodiment, the scanning device 202 may be employed to scan the first code 106 on the top side 102 and then the second code 108 on the bottom side 104. Scanning of the first code 106 may enable retrieval of the first information stored in the first code 106. Similarly, scanning of the second code 108 may enable retrieval of the second information stored in the second code 108. The second code 108 may be configured to be associated with the first code 106. The association of the first code 106 and the second code 108 may be in a way that the second information stored in the second code 108 may only be accessed upon successful scanning of the first code 106 on the top side 102 of the security label 100.

The first code 106 and the second code 108 may be configured in this way to avoid repetitive scanning of the second code 108 and determine tampering of the package 204. Once both the first code 106 and the second code 108 are discarded, on scanning of the either the first code 106 or the second code 108 may provide an error message.

In an alternate embodiment, a first code on a top side may be any machine scannable code. Whereas a second code on a bottom side of the security label may be an alpha-numeric code. The alpha-numeric code may be configured to be manually entered into a scanning device by a user for retrieval of a unique information associated with the alpha-numeric code.

In an alternate embodiment, alpha-numeric code provided on the security label may be configured to be machine scannable.

Figure 6:
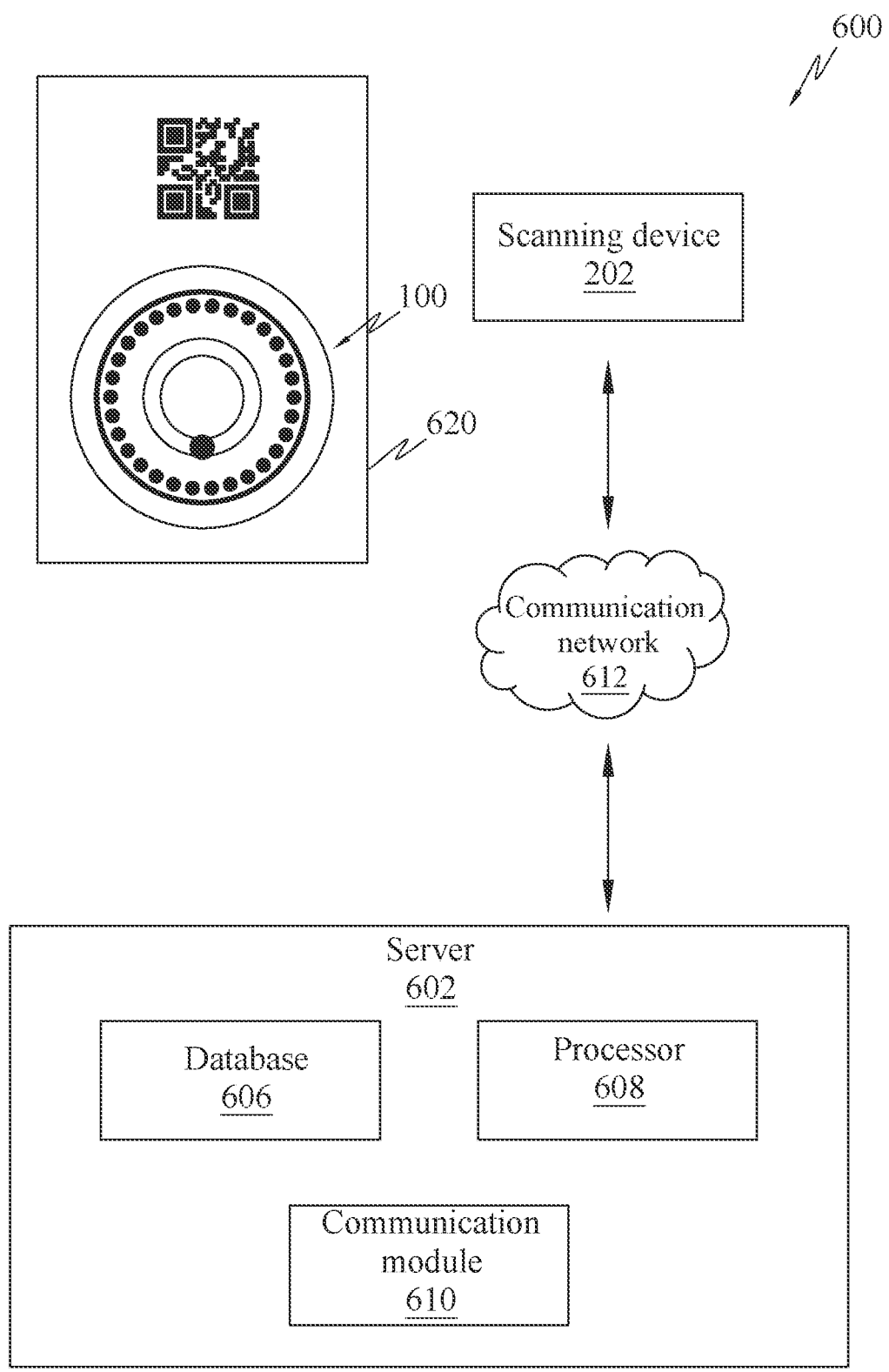
FIG. 6 illustrates a combined data retrieval and tamper-evident security system 600 with a server 602, in accordance with an embodiment.

FIG. 6 illustrates a combined data retrieval and tamper-evident security system 600 with a server 602. The system 600 may comprise of a security label 100, a scanning device 202, a server 602 comprising of a database 606, a processor 608 and a communication module 610. The security label 100 may be configured to be engaged over, but not limited to, any type of surface on a package 620. The scanning device 202 may be configured to be in communication with the server 602 over a communication network 612.

In an embodiment, the database 606 may include a permanent memory such as hard disk drive, may be configured to store data, and executable program instructions that are implemented by the processor 608. The database 606 may be implemented in the form of a primary and a secondary memory. The database 606 may store additional data and program instructions that are loadable and executable on the processor 608, as well as data generated during the execution of these programs. Further, the database 606 may be volatile memory, such as random-access memory and/or a disk drive, or non-volatile memory. The database 606 may comprise of removable memory such as a Compact Flash card, Memory Stick, Smart Media, Multimedia Card, Secure Digital memory, or any other memory storage that exists currently or may exist in the future. The database 606 may be configured to store information associated with a first code 106 or a second code 108 or any machine scannable code provided on respective top side 102 and bottom side 104 of the security label 100. The first code 106 may be associated with a first information and the second code 108 may be associated with a second information.

In an embodiment, the server 602 of the system may comprise a processor 608. The processor 608 may be implemented as appropriate in hardware, computer-executable instructions, firmware, or combinations thereof. Computer-executable instruction or firmware implementations of the processor 608 may include computer-executable or machine-executable instructions written in any suitable programming language to perform the various functions described. The processor 608 may be configured to instruct the scanning device 202 to perform actions based on pre-fed data stored in the database 606 or the data received from the scanning device 202 or combination of both.

In an embodiment, the server 602 may comprise of a communication module 610. The communication module 610, as an example, may be a GPRS module, or other modules that enable communication. The communication module 610 may include a modem, a network interface card (such as Ethernet card), a communication port, or a Personal Computer Memory Card International Association (PCM-CIA) slot, among others. The communication module 610 may include devices supporting both wired and wireless protocols. Data in the form of electronic, electromagnetic, optical, among other signals may be transferred via the communication module 610.

In an embodiment, scanning of the first code 106 or the second code 108 or any machine scannable code may enable communication of the scanning device 202 with the database 606 to retrieve information stored in the database 606 that may be associated with any of the scanned first code 106 or the second code 108 or any machine scannable code. Provision of database 606 may enable storage of data/information in greater details as database 606 may be configured to have bigger storage capacity as compared to any machine scannable codes.

Figure 7A:
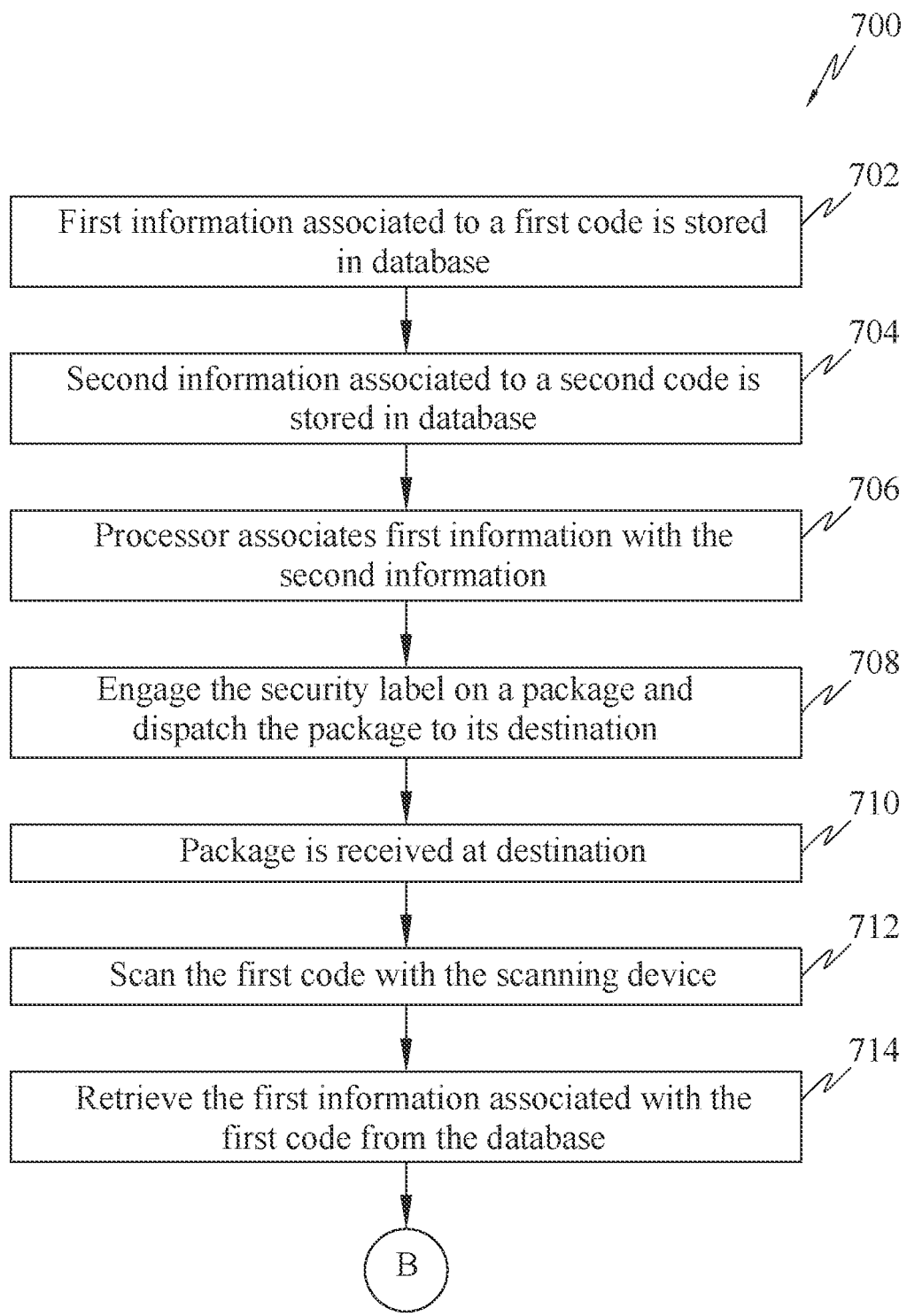
FIGS. 7A-7B illustrate a flowchart 700 for retrieval of information from database 606, in accordance with an embodiment.
Figure 7B:
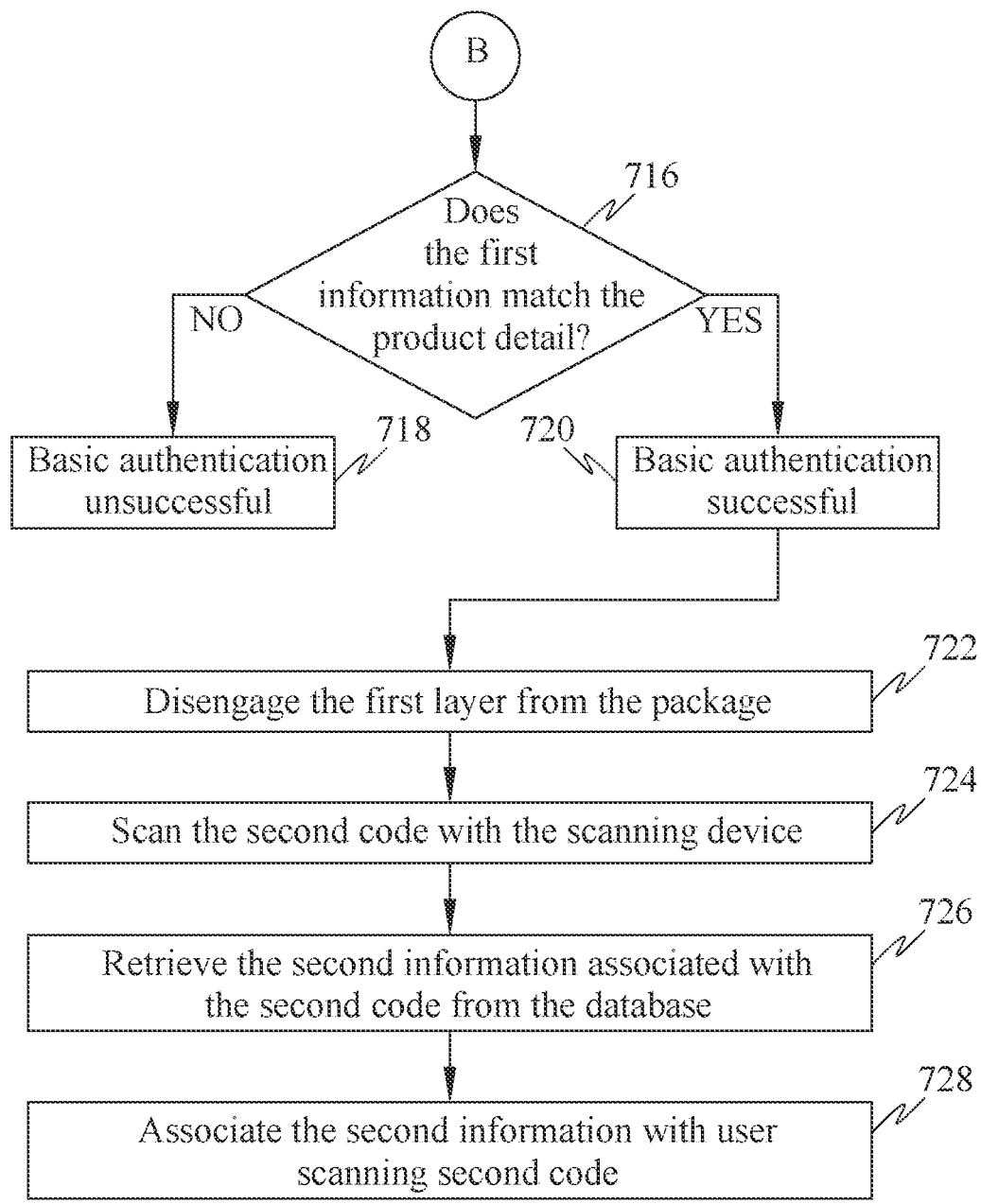

FIGS. 7A-7B illustrate a flowchart 700 for retrieval of information from database, in accordance with an embodiment. Referring to step 702, a first information associated with the first code 106 on the top side 102 is stored in the database 608. Here the first information discussed in the foregoing required for basic authentication is configured to be associated with the first code 106, and the database 606 is configured to store the information.

Referring to step 704, a second information associated with the second code 108 on the bottom side 104 is stored in the database 606. Here the second information discussed in the foregoing, which is a unique information, is configured to be associated with the second code 108, and the database 606 is configured to store the second information.

Referring to step 706, the processor 608 associates the first information with the second information. Here the processor 608 is configured to associate the unique information with the first information.

Referring to step 708, the security label 100 with the first code 106 and second code 108 is engaged to a package and despatched to its destination.

Referring to step 710, the package is received at its destination.

Referring to step 712, the first code 106 on the security label 100 is scanned by the scanning device 202.

Referring to step 714, the scanning device 202 communicates with the database 606 to retrieve the first information associated with the first code 106 stored in the database 606. Here upon scanning of the first code 106, the scanning device 202 is configured to communicate with the database 606. The processor 608 then checks for the information that is associated with the first code 106 stored in the database 608 and communicates the first information to the user scanning the first code 106.

Referring to step 716, the first information retrieved upon authentication of the first code 106 is compared with the first information of the package stored in the database 606. Here the first information may be used to verify package details and determine the basic authentication of the package, wherein the server 602 compares the first information associated with the first code 106 that is stored in database 606 with the information obtained from scanning the first code 106 of the security label 100 on the package.

In case the details do not match, authentication is unsuccessful (at step 718). In case the details match, the authentication is successful (at step 720).

Referring to step 722, the top side 102 is disengaged to reveal the second code 108 on the bottom side 104.

Referring to step 724, the second code 108 on the security label 100 is scanned by the scanning device 202.

Referring to step 726, the scanning device 202 communicates with the database 606 to retrieve the second information associated with the second code 108 stored in the database 606. Here upon scanning of the second code 108, the scanning device 202 is configured to communicate with the database 606. The processor 608 then checks for the information that is associated with the second code 108 stored in the database 606 and communicates the second information to the user scanning the second code 108.

At step 728, the server 602 may associate the obtained second information with the user scanning the second code 108.

In one embodiment, the server 602 may receive a unique identifier associated with the user scanning the second code 108 and associate the second information with the unique identifier of the user scanning the second code 108.

Figure 7C:
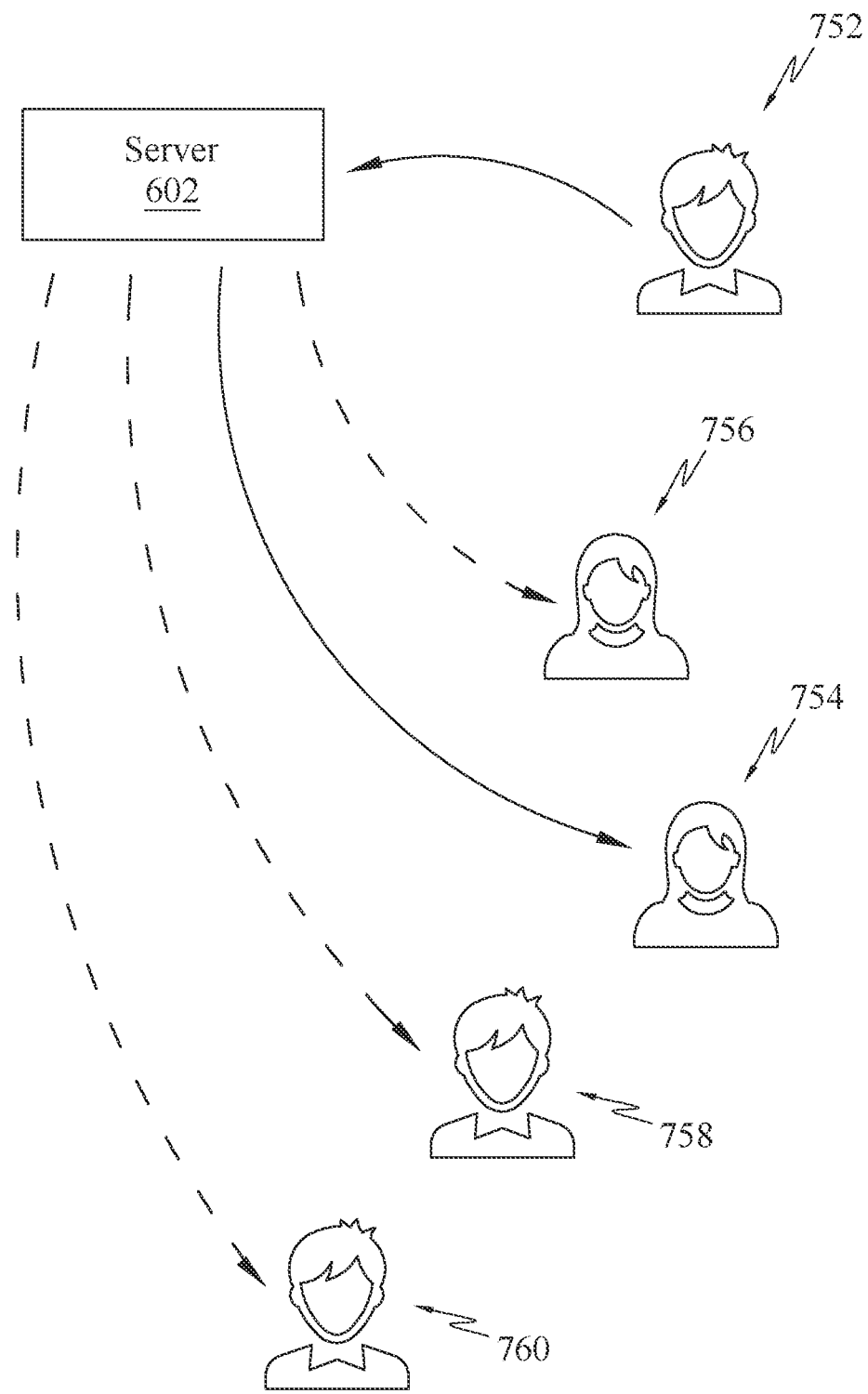
FIG. 7C illustrates a block diagram of a sever 602 communicating with users, in accordance with an embodiment.

Referring to FIG. 7C, an alternate embodiment of the system 600 is disclosed. The server 200 may be configured to receive an information from a user 752 scanning the second code 108. The user 752 scans the second code 108 after scanning of the first code 106. The user 752, on scanning of the second code 108 with the scanning device 202 may be prompted to provide details/information that may be associated with any one of subsequent users 754. The server 602, on receiving the information may be configured to store it in the database 606. The server 602 may be further configured to transmit the information received from the user 752 scanning the second code 108 to the respective subsequent user 754 to whom the information is associated. The server 602 may also be configured to transmit information associated to multiple users 756, 758, 760 that may be provided by user 752.

In an embodiment, the scanning device 202 may be any device that may be configured to scan machine scannable codes. The scanning device 202 may be configured to be in communication with the server 602 enabling data exchange to and from the database 606. The scanning device 202 may be a mobile device that may be configured to enable scanning of machine scannable codes. The scanning device 202 may be configured to provide input to the server 602 of the system from scanning of the machine scannable codes for retrieval of information from the database 606. The server 602 and the scanning device 202 may be configured to communicate over a communication network. The communication may be over a wired or a wireless network. (Refer FIG. 6)

In an embodiment, the mobile device may comprise of, but not limited to, a camera, a display, a processor and a memory module. The camera may be configured to scan any machine scannable codes. The display may be configured to show any information, for example the display may be configured to show the first information, or the second information retrieved by scanning of the first code 106 and the second code 108, respectively. The display may also be configured to provide input to the mobile device, wherein the display of the mobile device may be touch enabled, for example the user may use the display to enter any alphanumeric codes, if any as inputs.

In an embodiment, the scanning device 202 may be any scanning device like, but not limited to, a BAR code scanner, a QR code scanner or any GS1 code scanners that may be configured to scan machine scannable codes.

In an embodiment, the mobile devices (scanning device 202) may be configured to determine if the scanned security label is "Original" or "Duplicate". A pre-determined specification standards for a scanning device 202 required for scanning of the security labels 100 may be stored in the database 606 of the server 602. The pre-determined specification standards may allow classification of mobile devices. The scanning device 202 may be configured to run an initial test, wherein the specification of the scanning device 202 may be transferred to the server 602 and the processor 606 may be configured to compare the specifications with the pre-determined specification standards stored in the database 606 to classify if the scanning device 202 is optimum for the scanning of machine scannable copy-proof codes. The scanning device 202 may also be allowed to perform an initial security label scan to determine optimum focusing height of the scanning device 202. Upon determining the optimum focusing height for a scanning device 202, the focus height may be registered and stored in the scanning device 202 as a reference for future scans.

In an embodiment, if the specification of the scanning device 202 fails to meet the pre-determined specification standards, the instant scanning device 202 may be separately categorized, wherein any machine scannable copy-proof code scanned by such mobile devices may be stored in a "buffer state". The buffer state may be provisioned for scan-result in a way that codes detected with parameters close to the original code may be declared in buffer-state status but with a clear indication that complete test could not be performed and same may be logged on the database 606 on the server 602, wherein complete test may refer to, but not limited to, at-least three distinctive steps as captured in patent application PCT/IB2019/059097 that describes implementation of copy-proof code. First step simply checks if QR code is found valid in the database, second step checks if spatial orientation of dots is linked to the value of QR code, and finally third step checks if QR code is duplicated/photo copied. In case the parameters of the code in first and second step match but third step as scanned by the scanning device 202 is close to the original, the scanning device 202 may determine the code in buffer state.

In an embodiment, if parameters in the third step is not close to the original, then the scanning device 202 marks code as "Duplicate". Here the scanning device may be assumed to be in the "ideal state".

In an embodiment, the scanning device 202 may be separately categorized, wherein the codes scanned by the scanning device 202 are stored in "buffer state" in a scenario wherein specification of the scanning device 202 (for example camera/resolution/memory/auto-focus) meets the pre-determined specification standards stored in the database 606, but any one of the hardware of the scanning device 202 is faulty, for example a defective camera on a mobile phone but it is not able to consistently focus and results are varying too much between one frame to another.

In an embodiment, the buffer state may be configured to be a state between "Original" and "Duplicate" in a way that the machine scannable codes scanned in buffer state may neither be considered to be completely duplicate or completely original. It may happen when either scanning-device is of lower specification and/or is faulty. Another reason is print quality of the code, wherein print quality is not excellent either due to the printer-head, printing noise or there is smudging on substrate. It is to be noted that printing of copy-proof code is not limited to the printing-by-inks it can be printed by direct-part-marking using laser. Basically, it includes without any limitation any method that prints/disposes scannable micro-patterns.

Figure 8A:
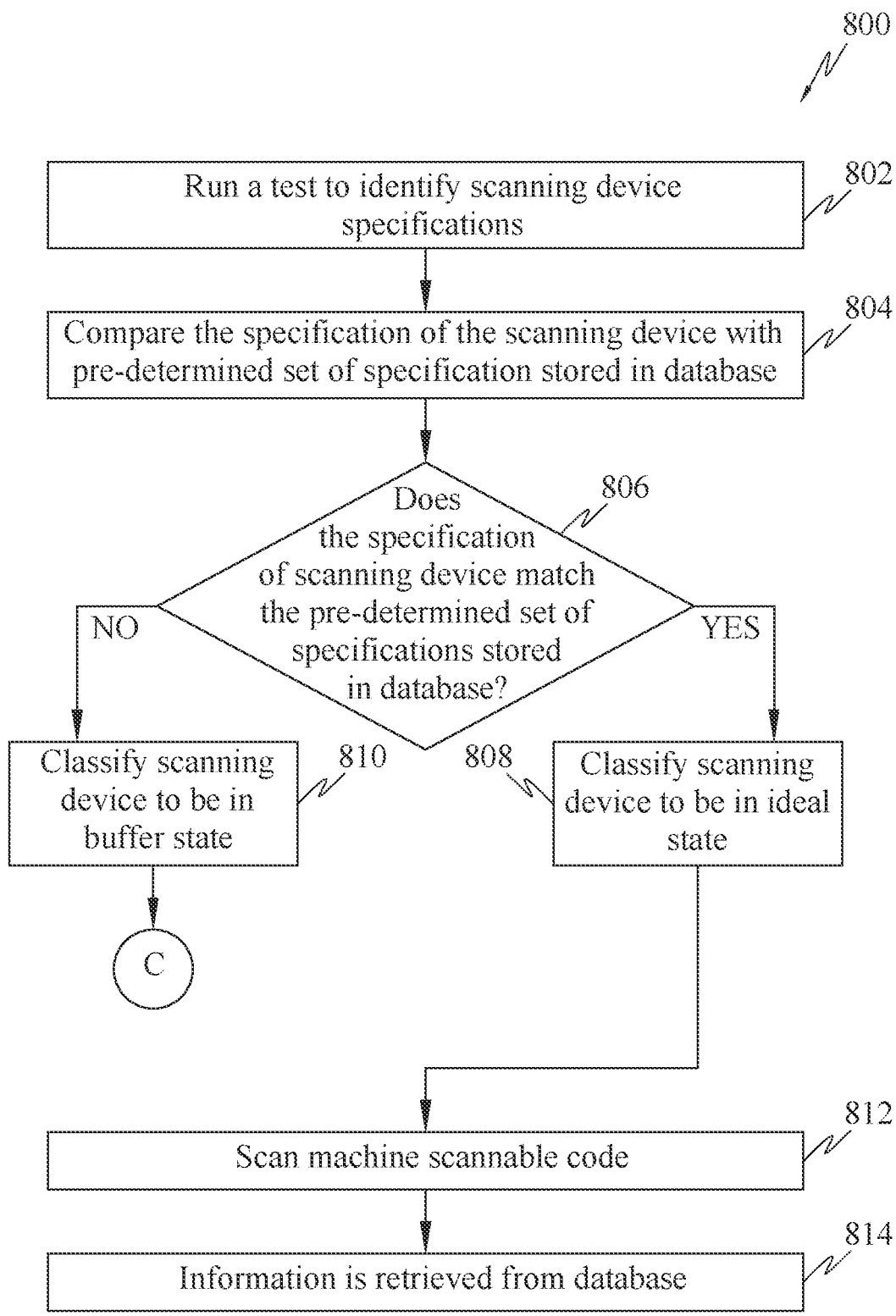
FIGS. 8A-8B illustrate a flowchart 800 for categorizing scanning devices 202 configured for scanning of machine scannable codes, in accordance with an embodiment.
Figure 8B:
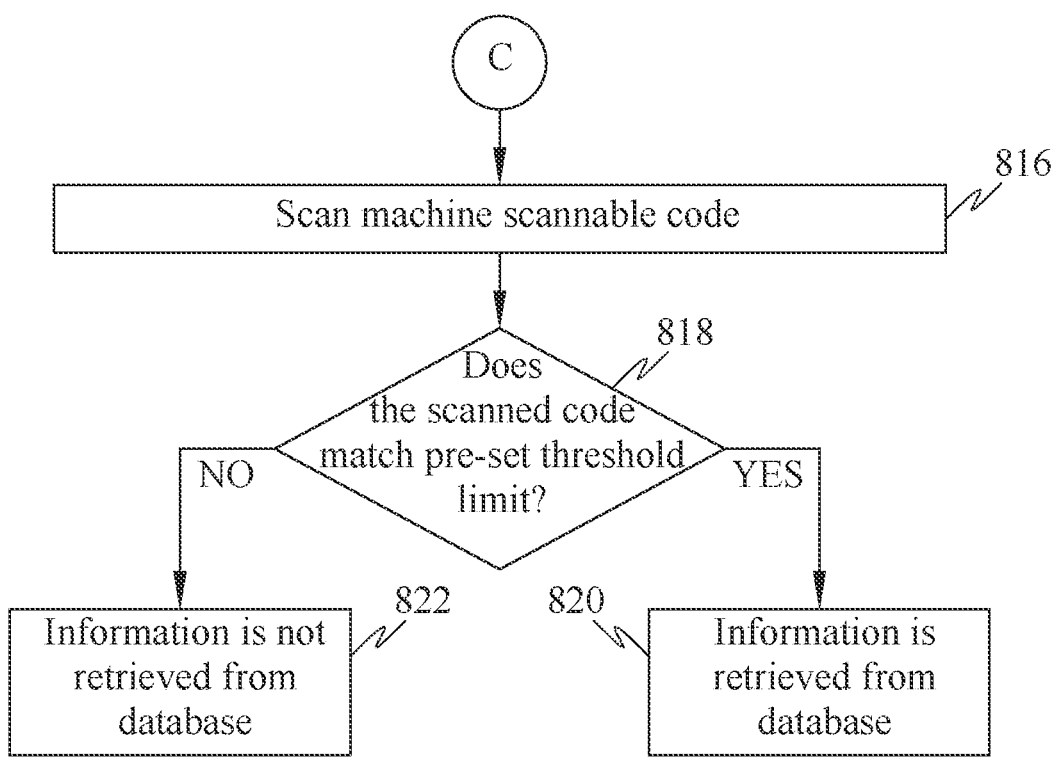

FIGS. 8A-8B illustrate a flowchart for categorizing scanning devices configured for scanning of machine scannable codes. Referring to step 802, an initial test for a scanning device 202 is run to determine the specification of the scanning device 202. Here details of hardware and software specifications of a scanning device 202 are collected.

Referring to step 804, specifications of the scanning device 202 is compared with the pre-determined set of specifications stored in the database 606. Here the hardware specification details of the scanning device 202 are transferred to the database 606, wherein the scanning device 202 hardware and software specification is compared with the pre-determined set of specifications stored in the database 606 (that may be optimum for scanning of machine scannable codes).

Referring to step 806, the server 602 determines if the scanning device 202 matches the pre-determined set of specifications stored in the database 606.

If the specifications of the scanning device 202 match with the pre-determined set of specifications stored in the database 606, the scanning device 202 is classified to be in an ideal state (step 808). If the specifications of the scanning device 202 do not match with the pre-determined set of specifications stored in the database 606, the scanning device 202 is classified to be in buffer state (step 810).

Referring to step 812, the machine scannable code is scanned by the scanning device 202. Here the scanning device 202 that is classified in the ideal state may be employed to scan the machine scannable codes for retrieving information associated with the instant code.

Referring to step 814, information associated with the machine scannable code is retrieved from the database 606.

Referring to step 816, the machine scannable code is scanned by the scanning device 202. Here the scanning device 202 that is classified to be in the buffer state may be employed to scan the machine scannable codes for retrieving information associated with the instant code.

Referring to step 818, the scanned code is checked if it matches a threshold limit of a copy of the scan of the same code stored in the database 606. Here the machine scannable copy-proof code scanned with the scanning device 202 classified in the buffer state is compared with a pre-set threshold value in order to classify the scans to be successful or unsuccessful. If the scanned code meets the pre-set threshold limit, information associated with the code is retrieved from the database 606 (at step 820). If the scanned code does not meet the pre-set threshold limit, information is not retrieved from the database 606 (at step 822).

In an alternate embodiment, the system may comprise of a database 606 provided with a server 602, wherein the database 606 may be configured to store a first information and a second information that may be associated with a product/package (refer FIG. 6). The system may comprise of security label 100 with machine scannable first code 106 and second code 108, wherein the first code 106 may be associated with the first information and the second code 108 may be associated with the second information, wherein each of the first code 106 and the second code 108 may be provided with, but not limited to, a URL that may be encoded in QR code.

In an embodiment, the server 602 of the system may be configured to create a record in the database 606 upon scanning of the first code 106 or the second code 108.

In an embodiment, wherein user is scanning the copy-proof code without using any specific APP (for example scanning merely QR code part of copy-proof code) upon a subsequent scan of the copy-proof code, the server 602 may be configured to notify a user of previous scanning of the same code on subsequent scanning of the respective code.

Figure 9A:
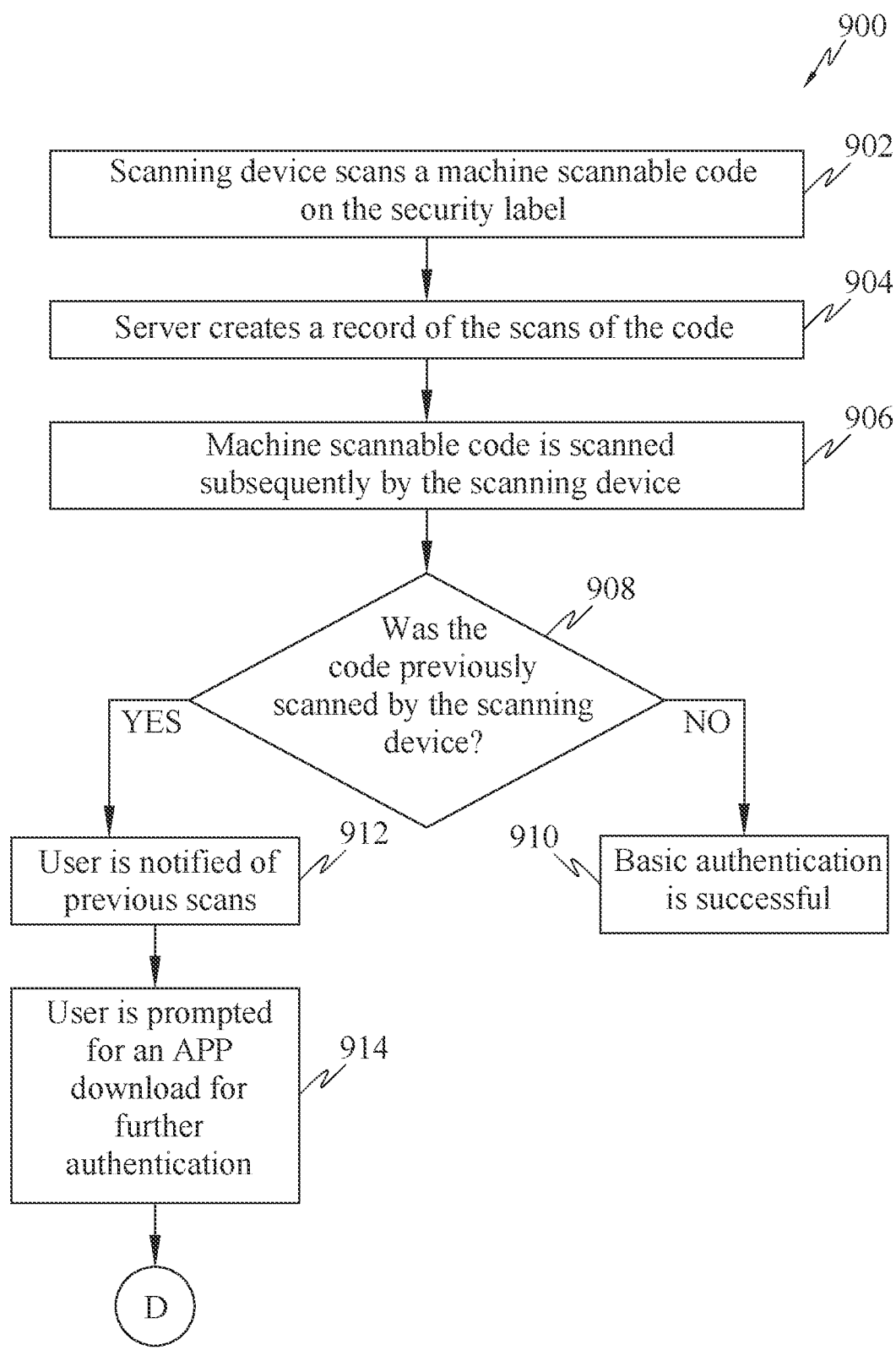
FIG. 9A-9B illustrates a flowchart 900 of a two-step approach for determining the authenticity of the copy-proof code on a package by need basis usage of application on scanning device (copy-proof code scan otherwise need application on scanning device), in accordance with an embodiment.
Figure 9B:
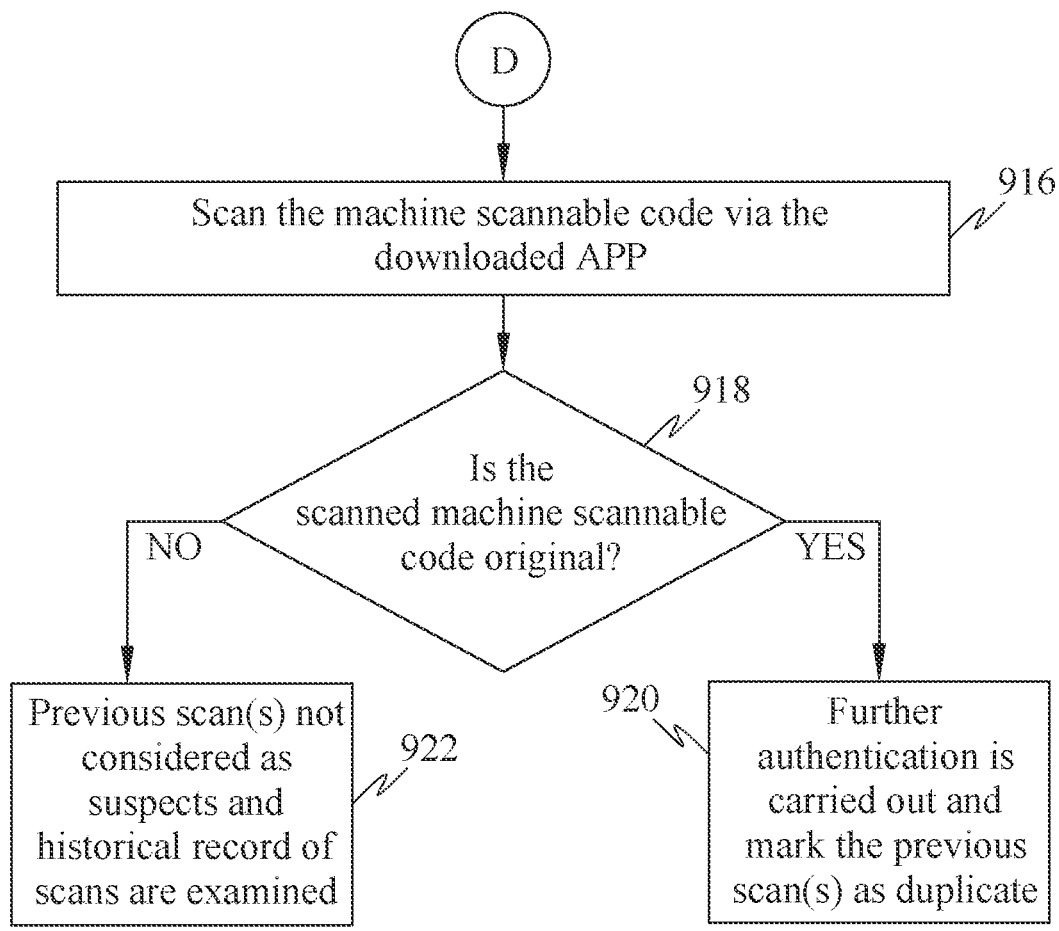
Figure 9C:
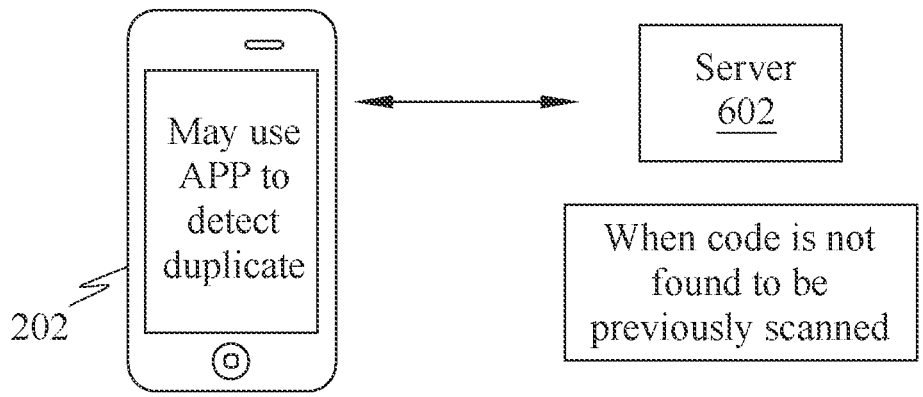
FIGS. 9C-9E illustrates communication between the server 602 and the scanning device 202, in accordance with an embodiment.
Figure 9D:
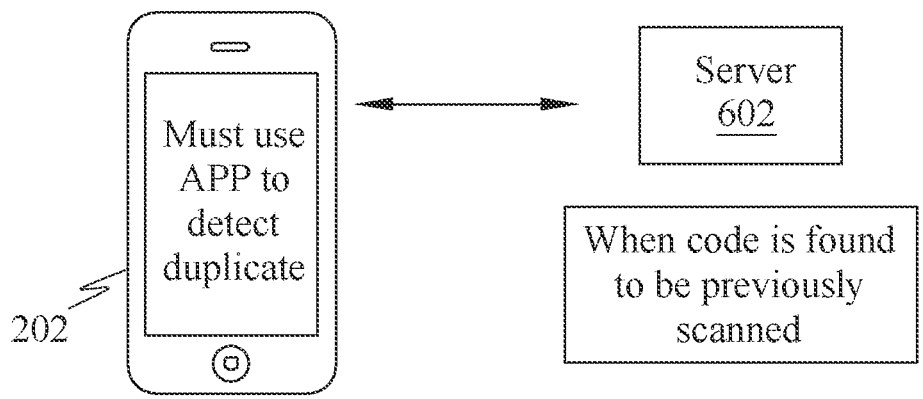

FIG. 9A-9B illustrates a flowchart of a two-step approach for determining the authenticity of the package with machine scannable copy-proof code. Referring to step 902, a machine scannable copy-proof code on a security label 100 is scanned by the scanning device 202.

Referring to step 904, server 602 creates a record of the scans of the machine scannable code in the database 606. For example, here the server 606 is configured to register the scans every time the machine scannable code is scanned by the scanning device 202 and create a scan-record associated with mobile number, location, device model and miscellaneous other details in the database 606.

Referring to step 906, the same machine scannable copy-proof code is scanned subsequently by the scanning device 202.

At step 908, the server 602 checks if the machine scannable copy-proof code was scanned previously by accessing the record of the scans stored in the database 606. For example, here upon scanning of the machine scannable code, the server 602 checks for records of any previous scans that are stored in the database 606.

If the server 602 finds no record of previous scans associated to the machine scannable code, the server 602 fails to determine any anomaly in scanning of the machine scannable code, at step 910 the basic authentication is successful. Detailed authentication via application download is optional.

In an embodiment, the user may be, but not limited to, prompted to download APP for further authentication. The server 602 may communicate with the scanning device 202 to prompt the user for downloading the APP (refer 9C).

Referring to step 912, if the machine scannable code was scanned previously, user is notified of the previous scans associated with the scanned machine scannable code and the basic authentication remains in-conclusive and user is prompted for authentication to be done mandatorily via the downloaded application.

Referring to step 914, the user is prompted for an application download for further authentication. For example, here if the machine scannable code is associated with multiple scans or the server determines any anomaly in scanning of the machine scannable code, the user may be redirected to a link for downloading an APP for further authentication (refer 9D).

Referring to step 916, the user scans the machine scannable code through the APP using the scanning device 202.

Referring to step 918, the server 602 determines if the machine scannable code is same as the original machine scannable code.

Figure 9E:
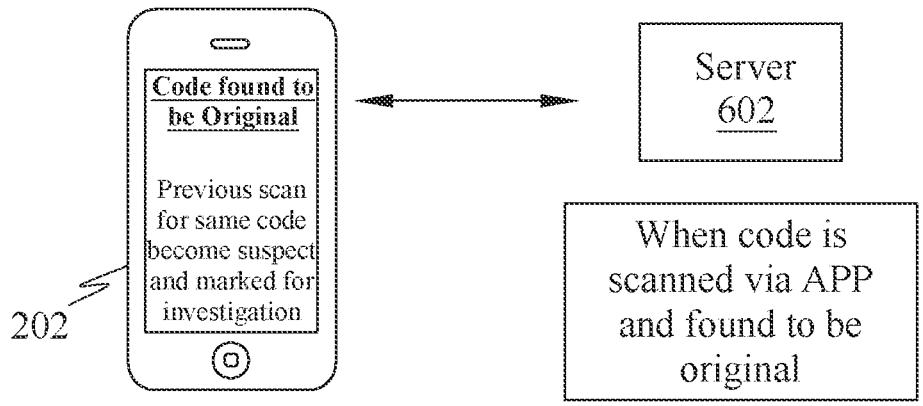

Referring to step 920, if the current machine scannable code was found to be original in the current scan, the server 602 classifies and marks the previous scan(s) of the same machine scannable copy-proof code (that was previously identified as original when scanned without application) as suspect and previous scan-data (mobile number/location/time and other miscellaneous details) may be considered for ground investigation (refer FIG. 9E).

Referring to step 922, if the server 602 determines, after scanning of the machine scannable code via the application, that the current machine scannable code is duplicate, the server 602 does not mark the previous scan(s) as suspect. Server 602 is configured to examine historical record of the scans stored in the database 606.

Figure 10A:
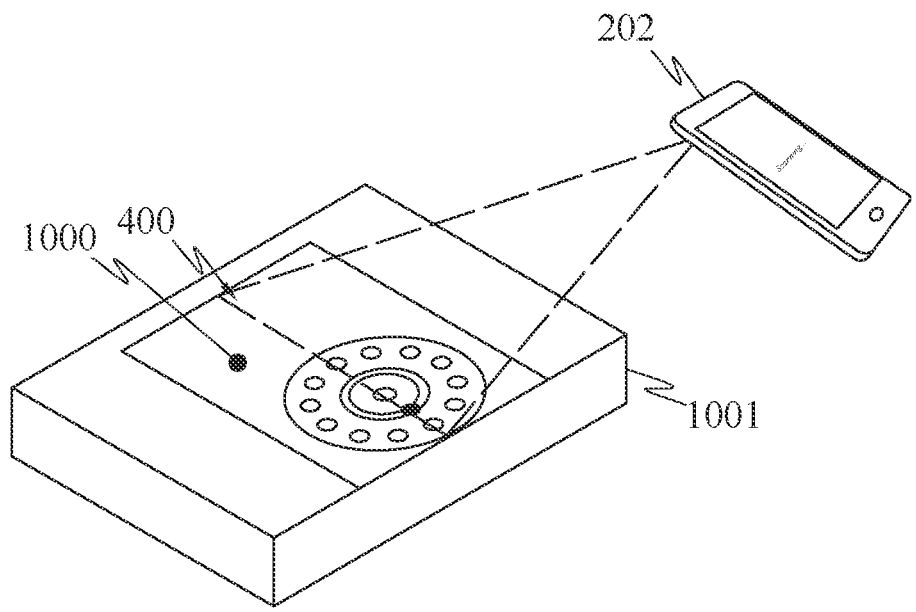
FIGS. 10A-10B illustrates a tamper-evident security label 400 with an external reference 1000, in accordance with an embodiment.
Figure 10B:
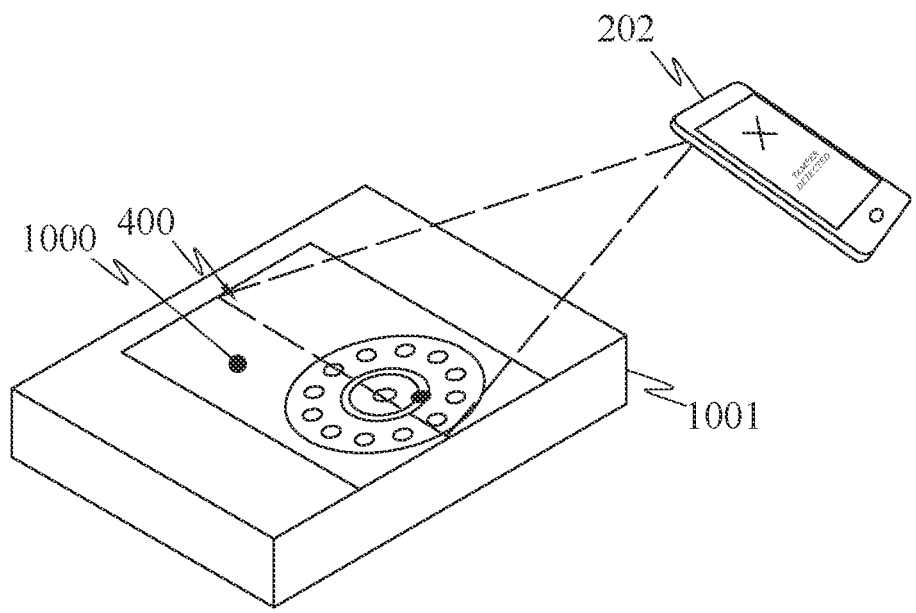

Referring to FIGS. 10A-10B, a tamper-evident security label 400 (refer FIG. 4A) with an external reference 1000 is provided, in accordance with an embodiment. The external reference 1000 may be provided at a spatial orientation with the security label 400. FIG. 10A illustrates initial scanning of the security label with respect to the external reference. FIG. 10B illustrates scanning of the security label with respect to the external reference when the security label is tampered with. Spatial orientation of scannable elements is well captured in patent U.S. Pat. No. 9,361,532 B2.

In an embodiment, a security label 400 with an external reference 1000 may be applied on a package 1001. The security label 400 with the external reference 1000 may be scanned to register a first spatial orientation of the security label 400 with respect to the external reference 1000 at a first stage. For example, the scanning device 202 is configured to scan the security label 400 with the external reference 1000 to register a first spatial orientation of a security label 400 with respect to an external reference 1000 at a first stage, wherein the first stage is when the security label 400 is initially engaged on a package 1001 before the package 1001 is dispatched to its destination. The first spatial orientation may be stored in the database 606 (refer FIG. 6).

In an embodiment, the security label 400 with the external reference 1000 may be scanned to register a second spatial orientation of the security label 400 with respect to the external reference 1000 at a second stage. For example, the scanning device 202 is configured to scan the security label 400 with the external reference 1000 to register a second spatial orientation of the security label 400 with respect to the external reference 1000 at second stage, wherein the second stage is when the package 1001 is received at its destination. The second spatial orientation may be stored in the database 606.

In an embodiment, the processor 608 may compare the second spatial orientation with the first spatial orientation to determine tampering. For example, a processor 608 is configured to compare the second spatial orientation of the security label 400 with the external reference 1000 with the first spatial orientation of the security label 400 with the external reference 1000 that are stored in the database 606. The processor 608 may be configured to determine if both the first spatial orientation and the second spatial orientation are same.

In a scenario with the security label 400 being tampered with, wherein the security label 400 is disengaged and reengaged on the package 1001, the spatial orientation of the security label 400 with respect to the external reference 1000 would change, thereby the second spatial orientation of the security label 400 registered by the scanning device 202 would be different from the first spatial orientation of the security label 400. If the spatial orientations do not match, then the processor 608 may determine tampering of the security label 400 and same may be communicated to the scanning device 202. In case the spatial orientations match, the processor 608 may determine no tampering and the same may be communicated to the scanning device 202 to display the same.

Referring to FIGS. 11A-11B, a two-layer security label 400 engaged on a bottle 1102 with a shrink wrap 1104 is disclosed, in accordance with an embodiment. The security label 400 may be engaged with a container 1102 with a cap 1106. A shrink wrap 1104 may be provided to encompass the cap 1106 of the container 1102 (refer FIG. 11A). The second layer 404 comprising of a second code 416 may be provided on a surface of the cap 1106 and the first layer 402 comprising of first code 426 may be disposed over the shrink wrap 1104. The first layer 402 comprising the first code 426 may be configured to be destructible on removal of the shrink wrap 1104 from the container 1102 (refer FIG. 11B), thereby giving access to the second layer 404 with the second code 416.

In an alternate embodiment, a first layer and a second layer may be self-adhesive, the first layer may be configured to be tamper-evident in a way that when the first layer is disengaged from the package, the first layer may leave behind tamper evident marks on the package on an area surrounding the second layer thereby making peeling of the top layer evident.

Referring to FIGS. 12A-12B, the two-layer security label 400 engaged on a bottle 1202 with breakable seal cap 1204 is disclosed, in accordance with an embodiment. The second layer 404 with the second code 416 may be engaged to the cap 1204 of the bottle 1202. The first layer 402 of the security label 400 may be engaged over the second layer 404. The first layer 402 may be configured to be tamper evident, in a way that when the first layer 402 is disengaged from the cap 1204, the first layer 402 may leave tamper-evident marks 1206 around the second code 416.

In an alternate embodiment, the second code 416 may be printed on the cap of the bottle 1202 or printed over second layer or bottom side of first layer. The first layer 402 may be engaged over the second code 416 and the first layer 402 may be tamper evident.

FIGS. 13A-13B and 14A-14B illustrate different embodiments wherein a two-layer security label 400 is engaged on the package.

In an embodiment the second code 416 may be, but not limited to, printed on the container and the first layer 402 may be engaged over the second code 416. The first layer 402 with the first code 426 may be a non-cloneable copy-proof code (refer FIGS. 13A-13B). One such copy-proof code is disclosed in patent application PCT/IB2019/059097.

Similarly, the second code 416 may be, but not limited to, printed on the product-label of the bottle and the first layer 402 may be engaged over the second code 416. Alternatively, both layers can be one monolithic label for brand-owner that gets applied on product-label. The first layer 402 may be, but not limited to, tamper-evident wherein disengagement of the first layer 402 may leave tamper evident marks over the bottle. The first layer 402 with the first code 426 may be a non-cloneable copy-proof code (refer FIGS. 14A-14B).

Figure 15A:
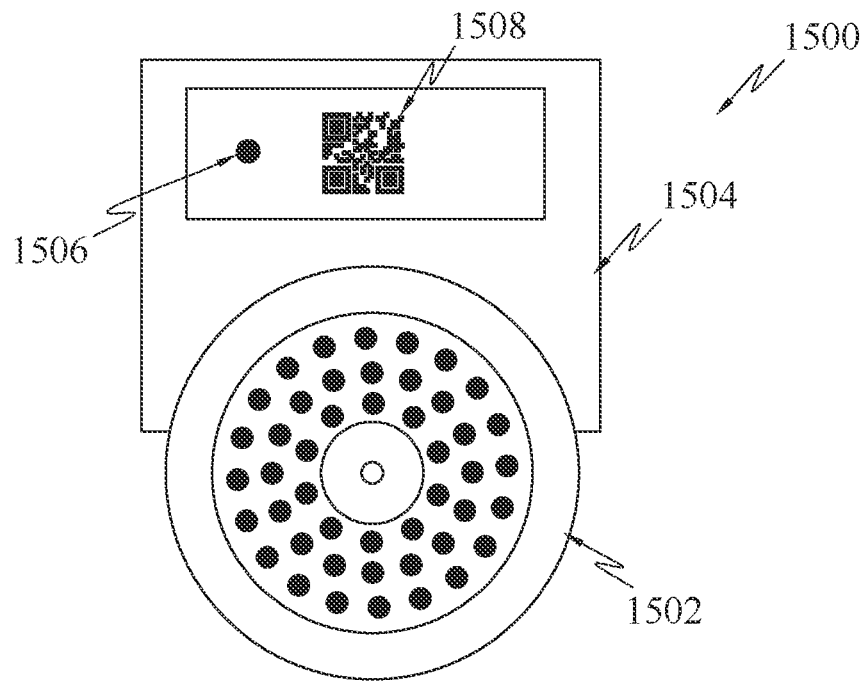
FIGS. 15A-15B illustrates a two-layer security label 1500 configured to be engaged on a package, in accordance with an embodiment.
Figure 15B:
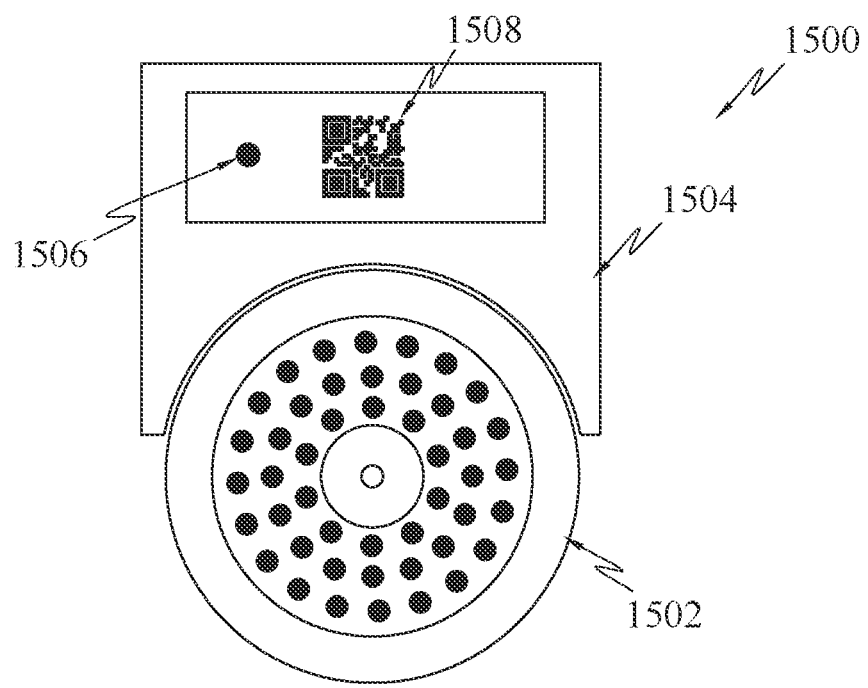

Referring to FIGS. 15A-15B, a two-layer security label 1500 may be provided that may be configured to be engaged on a package, in accordance with an embodiment. The two-part security label 1500 may be manufactured as a monolithic label (refer FIG. 15A) but may be configured to be split into two parts after a die cut (refer FIG. 15B). The security label 1500 may comprise a first part 1502 and a second part 1504. The first part 1502 of the security label 1500 may be provided with internal patterns (not shown in figures) and the second part 1504 of the security label 1500 may be provided with an external reference 1506. The internal patterns on the first part 1502 may be configured to be in a spatial orientation with the external reference 1506 on the second part 1504. The first part 1502 and the second part 1504 may be independently disengaged from the package. Reengagement of the first part 1502 or the second part 1504 may change the spatial orientation of the first part 1502 with respect to the external reference 1506 on the second part 1504.

In an embodiment, the spatial orientation between the first part 1502 and the external reference 1506 may be registered at the database 606 (refer FIG. 6) before engaging the two-part security label 1500 on the package. This implies that the spatial orientation of the internal patterns on the first part 1502 with respect to the external reference 1506 on the second part 1504 may be registered and recorded as a signature and may be configured to be associated with, but not limited to, a QR/GS1 code 1508 that may be provided on a portion of the second part 1504.

In an alternate embodiment, spatial orientation between a first part and an external reference may be registered at a database after engaging a two-part security label on a package. The spatial orientation may be configured to be stored in the database, wherein a second scan of the spatial orientation of the security label may be compared with the spatial orientation stored in the database to determine tampering.

Figure 16A:
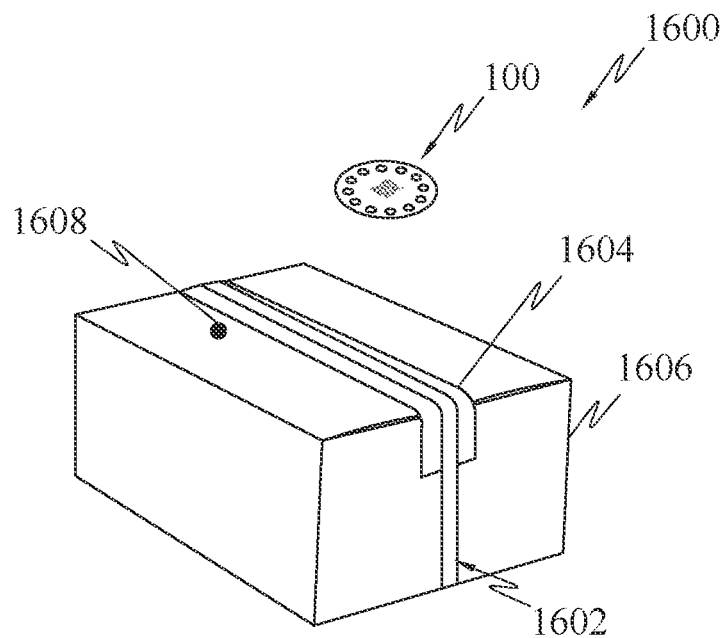
FIGS. 16A-16B illustrates a tamper-evident security system 1600 with a strapping band 1602, in accordance with an embodiment.
Figure 16B:
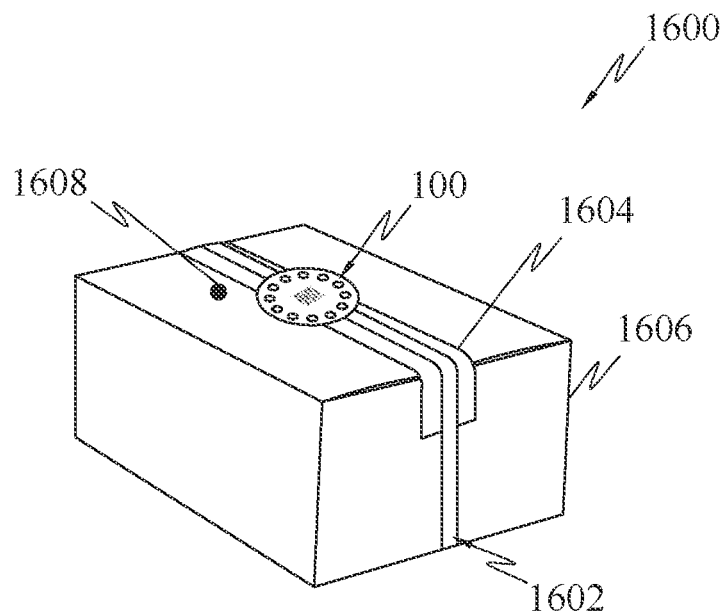

FIGS. 16A-16B illustrates a tamper-evident security system with a strapping band 1602, in accordance with an embodiment. The system comprises a security label 100, an adhesive tape 1604, and a strapping band 1602. The adhesive tape 1604 may be configured to be engaged to a package 1608 to cover at least a part of opening of the package 1606. The strapping band 1602 may be configured to be disposed over the adhesive tape 1604 in a way that the strapping band 1602 may surround the package 1606. The security label 100 may be disposed over the strapping band 1602 in a manner that a portion of the security label 100 interfaces with the adhesive tape 1604 and a portion of the security label 100 interfaces with the strapping band 1602. An external reference 1608 may be disposed on the package 1606 to be in spatial orientation with the security label 100. The security label 100 may be provided with a pattern that may be configured to be, but not limited to, machine scannable.

In an alternate embodiment, a tamper-evident security system may comprise a security label, a first tape and a second tape, in accordance with an embodiment. The first tape may be shorter than the second tape. The first tape may be engaged to the package and the second tape may be engaged over the first tape. The first tape may comprise of patterns that may be machine scannable. The second tape may be provided with plurality of holes along its length and may be configured to be engaged over the first tape in a way that at least a portion of the first tape may be exposed through holes. The security label may be engaged on the package in a way that at least a portion of the security label engages with the second tape and at least a portion of the security label engages with the first tape through the holes on the second tape. The security label may be tamper-evident in a way that upon disengagement of the security label, the security label may leave tamper evident trace on the second tape and the first tape.

In an alternate embodiment, a first tape comprising of machine scannable patterns may be engaged on a package and a pair of second tapes may be engaged to the package in a way that the pair of the second tapes are disposed over the first tape on either side of the first tape and the pair of the second tapes run parallel to the first tape thereby exposing at least a portion of the first tape in between the pair of second tapes. The security label may be engaged on the package in a way that at least a portion of the security label is engaged to the pair of second tapes and at least a portion of the security label is engaged to the first tape with the patterns. The security label may be tamper-evident in a way that upon disengagement of the security label, the security label may leave tamper evident traces on the first tape and the pair of second tapes.

The processes described above is described as a sequence of steps. This was done solely for the sake of illustration. Accordingly, it is contemplated that some steps may be added, some steps may be omitted, the order of the steps may be re-arranged, or some steps may be performed simultaneously.

Although embodiments have been described with reference to specific example embodiments, it will be evident that various modifications and changes may be made to these embodiments without departing from the broader spirit and scope of the system and method described herein. Accordingly, the specification and drawings are to be regarded in an illustrative rather than a restrictive sense.

Many alterations and modifications of the present invention will no doubt become apparent to a person of ordinary skill in the art after having read the foregoing description. It is to be understood that the phraseology or terminology employed herein is for the purpose of description and not of limitation. It is to be understood that the description above contains many specifications, these should not be construed as limiting the scope of the invention but as merely providing illustrations of some of the personally preferred embodiments of this invention.

I claim:

1. A combined data retrieval and tamper-evident security system comprising of:
   a security label, wherein the security label comprises:
      a first layer with a first code;
      a second code concealed under the first layer, wherein,
         at least a portion of the second code remain concealed until the first layer is irreversibly disengaged;
         disengagement of the first layer is irreversible such that even if same or replica of the first layer with the first code is physically re-engaged on same security label, the prior disengagement gets detected in an automated scan;
         the first code is configured to be scanned multiple times;
         the first code is associated with a first information;
         the second code is associated with a second information; and
         authentication of both the codes is interlinked;
   a scanning device; and
   a server comprising a database and a processor, wherein the server is configured to:
      create a record in the database, upon scanning a current copy-proof code on the security label using the scanning device;
      determine, upon scanning of the current copy-proof code, whether the current copy-proof code was previously scanned by the scanning device, wherein, the copy-proof code is the first code; and
      upon determination of the current copy-proof code being previously scanned,
         the server is configured to:
            notify a user regarding previous scans; and
            prompt the user to download an application for scanning the current copy-proof code via the application and determining originality of the current copy-proof code, wherein the application is configured to:
               classify the previous scans of the current copy-proof code as suspect and prompt the user to complete the authentication using the downloaded application, upon determining that the current copy-proof code is original; or
               examine historical record of the previous scans of the copy-proof code without classifying the previous scans of the current copy-proof code as suspect, upon determining the current copy-proof code as duplicate.

2. The system as claimed in claim 1, wherein,
   the second code is associated with the first code on the first layer; and
   the second code is activated only after authentication of the first code.

3. The system as claimed in claim 2, wherein,
   the first information relates to an information of a package on which the security label is engaged, wherein the information is used to determine authenticity of the package; and
   the second information relates to an additional unique information of the package.

4. The system as claimed in claim 2, wherein the scanning device is configured to scan at least one of the first code or the second code,
   wherein,
      the first code and the second code are machine scannable;
      the first information is encoded into the first code; and
      the second information is encoded into the second code.

5. The system as claimed in claim 4, wherein:
   scanning of the first code enables retrieval of the first information; and
   scanning of the second code enables retrieval of the second information.

6. The system as claimed in claim 5, wherein,
   the database is configured to store:
      the first information associated with the first code; and
      the second information associated with the second code;
   the processor is configured to associate the second information with a user scanning the second code; and
   the server is configured to receive information from the user scanning the second code, wherein the user is prompted to provide information that is associated with at least one of subsequent user.

7. The system as claimed in claim 6, wherein the server is configured to:
   receive a unique identifier associated with the user scanning the second code; and
   associate the second information with the unique identifier of the user scanning the second code.

8. The system as claimed in claim 7, wherein:
   scanning of the first code by the scanning device enables retrieval of the first information stored in the database; and
   scanning of the second code by the scanning device enables retrieval of the second information stored in the database.

9. The system as claimed in claim 8, wherein the server is configured to transmit the received information to the subsequent user, wherein the received information corresponds to an information associated with the subsequent user.

10. The system as claimed in claim 7, wherein,
    scanning of the first code by the scanning device enables retrieval of the first information stored in the database; and the second code on the second layer is configured to be manually entered into the scanning device to enable retrieval of the second information stored in the database.

11. The system as claimed in claim 7, wherein the server is configured to:
receive specifications of the scanning device from the scanning device;
compare the received specification of the scanning device with a pre-determined set of specifications stored in the database;
categorize the scanning device to be in an ideal state if the specification matches the pre-determined set of specifications stored in the database; and
categorize the scanning device to be in a buffer state if the specification fails to match the pre-determined set of specifications stored in the database.

12. The system as claimed in claim 7, the system comprises of an external reference that is disposed at a spatial orientation with the first layer, wherein,
the scanning device is configured to scan the first layer at a first stage to register a first spatial orientation of the first layer with respect to the external reference; and
the database is configured to store the first spatial orientation of the first layer with respect to the external reference.

13. The system as claimed in claim 12, wherein,
the scanning device is configured to scan the first layer at a second stage to register a second spatial orientation of the first layer with respect to the external reference; and
the database is configured to store the second spatial orientation of the first layer with respect to the external reference.

14. The system as claimed in claim 13, wherein the server is configured to:
compare the first spatial orientation of the first layer with respect to the external reference with the second spatial orientation of the first layer with respect to the external reference stored in the database; and
determine tampering if the second spatial orientation does not match with the first spatial orientation.

15. The system as claimed in claim 7, wherein the server is configured to:
authenticate the copy-proof code if the copy-proof code was not previously scanned.

16. A method for securing a package using at-least two interlinked codes in security label, the method comprising:
providing a first layer comprising a first code on exposed face and a second code hidden under the first layer;
engaging the first layer to the package such that the first code is exposed, and the second code remains concealed under the first layer;
enabling access to the second code by physical disengagement of the first layer from the package, wherein disengagement of the first layer is irreversible such that even if same or replica of the first layer with the first code is physically re-engaged, the prior disengagement is detected in an automated scan;
scanning the first code to retrieve first information; and
scanning the second code, upon disengagement of the first layer, to retrieve second information associated with the package, wherein:
the first code and the second code are configured to be scanned respectively for authentication and additional services;
scan of the first code and the second code is digitally interlinked;
the second code is accessible and scannable only after the first layer has been disengaged, thereby preventing re-engagement of the first layer in a manner that conceals the initial disengagement; and
the first code is digitally invalidated in a database upon the scanning of the second code.

17. A method for securing a package using at-least two interlinked codes in a security label, the method comprising:
providing a first layer with a first portion, wherein:
the first portion is provided with a first code;
the first code on the first portion is visible to a user, wherein the first code is configured to be scanned multiple times for authentication; and
a second code is disposed under the first layer;
engaging the first layer to the package such that the first code is exposed, and the second code remains concealed under the first layer;
scanning at least the first portion of the first layer to register a first spatial orientation;
enabling access to the second code by physical disengagement of the first portion of the first layer from the package, wherein disengagement of the first portion is irreversible such that even if same or replica of the first layer is physically re-engaged, the prior disengagement gets detected in an automated scan;
scanning the first code to retrieve first information; and
scanning the second code, upon disengagement of the first portion of the first layer, to retrieve second information associated with the package, wherein:
the first code and the second code are configured to be scanned respectively for authentication and additional services;
the first spatial orientation is altered upon disengagement and re-engagement of the first portion, wherein tampering is indicated in an automated scan due to change in spatial orientation;
disengagement of the first portion reveals the second code digitally interlinked with first code; and
the first code is digitally invalidated in a database upon the scanning of the second code.

18. The method for securing the package using the security label as claimed in claim 16, further comprising:
determining, upon scan of second code, whether the first code interlinked with the second code was previously scanned and passed as original in the authentication scan;
determining location of scans of the first code and the second code to determine if the location of scan of the first code matches the location of scan of the second code to verify authentication of the first code and the second code; and
determining whether the first code and the second code are scanned within a predetermined time frame to verify authentication of the first code and the second code.

19. The method for securing the package using the security label as claimed in claim 17, further comprising:
determining, upon scan of second code, whether the first code interlinked with the second code was previously scanned and passed as original in the authentication scan;
determining location of scans of the first code and the second code to determine if the location of scan of the first code matches the location of scan of the second code to verify authentication of the first code and the second code; and determining whether the first code and the second code are scanned within a predetermined time frame to verify authentication of the first code and the second code.

\* \* \* \* \*